(12) United States Patent
Dietz et al.

(10) Patent No.: US 10,404,974 B2
(45) Date of Patent: *Sep. 3, 2019

(54) PERSONALIZED AUDIO-VISUAL SYSTEMS

(71) Applicant: Misapplied Sciences Inc., Redmond, WA (US)

(72) Inventors: Paul Henry Dietz, Redmond, WA (US); Albert Han Ng, Redmond, WA (US); David Steven Thompson, Redmond, WA (US)

(73) Assignee: Misapplied Sciences, Inc., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/934,068

(22) Filed: Mar. 23, 2018

(65) Prior Publication Data

US 2019/0028696 A1    Jan. 24, 2019

Related U.S. Application Data

(60) Provisional application No. 62/535,707, filed on Jul. 21, 2017.

(51) Int. Cl.
*H04N 13/327* (2018.01)
*H04N 13/324* (2018.01)
(Continued)

(52) U.S. Cl.
CPC ....... *H04N 13/327* (2018.05); *G02B 27/2214* (2013.01); *H04N 13/324* (2018.05); *H04S 7/302* (2013.01); *H04N 13/351* (2018.05)

(58) Field of Classification Search
CPC .............................. G09F 19/14; H04N 13/351
See application file for complete search history.

(56) References Cited

U.S. PATENT DOCUMENTS 5,855,425 A    1/1999   Hamagishi
5,949,581 A    9/1999   Kurtenbach et al.
(Continued)

FOREIGN PATENT DOCUMENTS

EP    2 685 735 A1    1/2014
WO    02/24470 A1    3/2002
(Continued)

OTHER PUBLICATIONS

International Search Report, dated Jun. 3, 2016, for International Application No. PCT/US2016/014122, 3 pages.
(Continued)

*Primary Examiner* — Paulos M Natnael
(74) *Attorney, Agent, or Firm* — Seed IP Law Group LLP

(57) ABSTRACT

An audio-visual system includes an audio source configured to produce multiple audio. The system includes one or more multi-view (MV) pixels, each configured to emit beamlets in different directions in a beamlet coordinate system. The system includes a processor that receives a specification of multiple listening/viewing zones located in a listening/viewing zone coordinate system. The processor associates multiple audio and visual contents with the multiple listening/viewing zones, respectively, and determines an audio mapping that translates between the listening/viewing zone coordinate system and the audio source and a visual mapping that translates between the listening/viewing zone coordinate system and the beamlet coordinate system. For each of multiple audio generated from the multiple audio contents, the processor, using the audio mapping, identifies an audio parameter value to produce the audio at a corresponding listening/viewing zone. For each of multiple images generated from the multiple visual contents, the processor, using the visual mapping, identifies a bundle of
(Continued)

beamlets from each of the MV pixels directed to a corresponding listening/viewing zone to form the image.

19 Claims, 10 Drawing Sheets

(51) Int. Cl.
   *H04N 13/351* (2018.01)
   *G02B 27/22* (2018.01)
   *H04S 7/00* (2006.01)

(56) References Cited

U.S. PATENT DOCUMENTS

| | | |
|---|---|---|
| 6,339,421 B1 | 1/2002 | Puckeridge |
| 6,377,295 B1 | 4/2002 | Woodgate et al. |
| 7,001,023 B2 | 2/2006 | Lee et al. |
| 7,462,104 B2 | 12/2008 | De Cesare |
| 7,602,395 B1 | 10/2009 | Diard |
| 7,990,498 B2 | 8/2011 | Hong |
| 8,461,995 B1 | 6/2013 | Thornton |
| 9,080,279 B2 | 7/2015 | Jun et al. |
| 9,396,588 B1 | 7/2016 | Li |
| 9,715,827 B2 | 7/2017 | Ng et al. |
| 9,743,500 B2 | 8/2017 | Dietz et al. |
| 9,792,712 B2 | 10/2017 | Ng et al. |
| 2003/0065805 A1 | 4/2003 | Barnes, Jr. |
| 2003/0115096 A1 | 6/2003 | Reynolds et al. |
| 2003/0156260 A1 | 8/2003 | Putilin et al. |
| 2004/0252374 A1 | 12/2004 | Saishu et al. |
| 2005/0093986 A1 | 5/2005 | Shinohara et al. |
| 2005/0195330 A1 | 9/2005 | Zacks et al. |
| 2009/0109126 A1 | 4/2009 | Stevenson et al. |
| 2009/0273486 A1 | 11/2009 | Sitbon |
| 2010/0002079 A1* | 1/2010 | Krijn ............... G02B 27/0093 348/148 |
| 2010/0085517 A1 | 4/2010 | Hong |
| 2010/0207961 A1 | 8/2010 | Zomet |
| 2010/0214537 A1 | 8/2010 | Thomas |
| 2010/0246018 A1 | 9/2010 | Yu |
| 2011/0159929 A1 | 6/2011 | Karaoguz et al. |
| 2011/0169863 A1 | 7/2011 | Kawai |
| 2011/0216171 A1 | 9/2011 | Barre et al. |
| 2011/0242298 A1 | 10/2011 | Bathiche et al. |
| 2011/0304613 A1 | 12/2011 | Thoresson |
| 2012/0026157 A1* | 2/2012 | Unkel ............... G09G 3/003 345/419 |
| 2012/0062565 A1 | 3/2012 | Fuchs et al. |
| 2012/0105445 A1 | 5/2012 | Sakai et al. |
| 2012/0114019 A1 | 5/2012 | Wallace et al. |
| 2012/0140048 A1 | 6/2012 | Levine |
| 2012/0218253 A1 | 8/2012 | Clavin |
| 2012/0268451 A1 | 10/2012 | Tsai et al. |
| 2012/0300711 A1 | 11/2012 | Wang et al. |
| 2013/0013412 A1 | 1/2013 | Altman et al. |
| 2013/0093752 A1 | 4/2013 | Yuan |
| 2013/0169765 A1 | 7/2013 | Park et al. |
| 2013/0182083 A1 | 7/2013 | Grossmann |
| 2013/0282452 A1 | 10/2013 | He |
| 2013/0298173 A1 | 11/2013 | Couleaud et al. |
| 2014/0015829 A1 | 1/2014 | Park et al. |
| 2014/0035877 A1 | 2/2014 | Cai et al. |
| 2014/0061531 A1 | 3/2014 | Faur et al. |
| 2014/0111101 A1 | 4/2014 | McRae |
| 2014/0300711 A1 | 10/2014 | Kroon et al. |
| 2014/0313408 A1* | 10/2014 | Sharma ............... G06F 3/1454 348/383 |
| 2014/0316543 A1* | 10/2014 | Sharma ............... G06F 3/1454 700/94 |
| 2015/0020135 A1 | 1/2015 | Frusina et al. |
| 2015/0042771 A1 | 2/2015 | Jensen et al. |
| 2015/0049176 A1 | 2/2015 | Hinnen et al. |
| 2015/0062314 A1* | 3/2015 | Itoh ............... G06F 3/012 348/55 |
| 2015/0085091 A1 | 3/2015 | Varekamp |
| 2015/0092026 A1 | 4/2015 | Baik et al. |
| 2015/0198940 A1 | 7/2015 | Hwang et al. |
| 2015/0229894 A1 | 8/2015 | Dietz |
| 2015/0279321 A1 | 10/2015 | Falconer et al. |
| 2015/0293365 A1 | 10/2015 | Van Putten et al. |
| 2015/0334807 A1 | 11/2015 | Gordin et al. |
| 2015/0356912 A1 | 12/2015 | Dietz |
| 2016/0012726 A1 | 1/2016 | Wang |
| 2016/0210100 A1 | 7/2016 | Ng et al. |
| 2016/0212417 A1 | 7/2016 | Ng et al. |
| 2016/0224122 A1 | 8/2016 | Dietz et al. |
| 2016/0227201 A1 | 8/2016 | Ng et al. |
| 2016/0261837 A1 | 9/2016 | Thompson et al. |
| 2016/0261856 A1 | 9/2016 | Ng et al. |
| 2016/0293003 A1 | 10/2016 | Ng et al. |
| 2016/0341375 A1 | 11/2016 | Baker |
| 2016/0341377 A1 | 11/2016 | Eddins |
| 2016/0364087 A1 | 12/2016 | Thompson et al. |
| 2016/0366749 A1* | 12/2016 | Dietz ............... H05B 37/029 |
| 2016/0371866 A1 | 12/2016 | Ng et al. |
| 2017/0155891 A1 | 6/2017 | Hu et al. |
| 2017/0205889 A1 | 7/2017 | Ng et al. |
| 2018/0115772 A1* | 4/2018 | Thompson ............ H04N 13/351 |
| 2018/0277032 A1* | 9/2018 | Ng ............... G09G 3/02 |
| 2018/0357981 A1 | 12/2018 | Ng et al. |
| 2019/0015747 A1* | 1/2019 | Thompson ............ A63F 13/52 |
| 2019/0019218 A1* | 1/2019 | Thompson ......... G06Q 30/0255 |
| 2019/0028696 A1* | 1/2019 | Dietz ............... H04N 13/327 |

FOREIGN PATENT DOCUMENTS

| | | |
|---|---|---|
| WO | 2013/183108 A1 | 12/2013 |
| WO | 2016/118622 A1 | 7/2016 |
| WO | 2016/141248 A1 | 9/2016 |

OTHER PUBLICATIONS

International Search Report, dated May 12, 2016, for International Application No. PCT/US2016/020784, 4 pages.
International Search Report, dated Sep. 29, 2016, for International Application No. PCT/US2016/037185, 4 pages.
International Search Report, dated Jun. 21, 2018, for International Application No. PCT/US2018/024024, 3 pages.
International Search Report, dated Feb. 25, 2019, for International Application No. PCT/US2018/059859, 14 pages.

* cited by examiner

PERSONALIZED AUDIO-VISUAL SYSTEMS

BACKGROUND

Technical Field

This disclosure relates to a personalized audio-visual system and method, and particularly to an audio-visual system and method capable of producing multiple personalized or individualized audio and images, using an audio source and one or more multi-view (MV) pixels, at multiple listening/viewing zones, respectively.

Description of the Related Art

With advancement in display technology, display devices have become smaller, thinner and cheaper, with crisper images. The fundamental functionality of a display device, however, has remained substantially the same—a display device forms an image that simultaneously appears the same to viewers at all locations from which the display device can be seen. When combined with audio, the fundamental functionality has remained substantially the same—the audio that accompanies an image on the display device, which image simultaneously appears the same to viewers at all locations, is also the same to listeners at all locations.

BRIEF SUMMARY

According to an exemplary embodiment, an audio-visual system is provided which includes an audio source, and one or more multi-view (MV) pixels, wherein each MV pixel is configured to emit beamlets (individually controllable beams) in different directions in a beamlet coordinate system. The audio-visual system includes an input node which, in operation, receives a specification of multiple listening/viewing zones located in a listening/viewing zone coordinate system, for example relative to the MV pixels. The audio-visual system includes a processor which is coupled to the input node. The processor associates multiple audio and visual contents with the multiple listening/viewing zones, respectively. The processor, in operation, determines (e.g., identifies, accesses) an audio mapping that translates between the listening/viewing zone coordinate system (where the multiple listening/viewing zones are specified) and the audio source. The processor also determines a visual mapping that translates between the listening/viewing zone coordinate system and the beamlet coordinate system (where the MV-pixel beamlets are emitted in different directions). For each of multiple audio generated from the multiple audio contents, the processor, using the audio mapping, identifies an audio parameter value to produce the audio at one listening/viewing zone, wherein the audio parameter value that produces one audio at one listening/viewing zone is different from the audio parameter value that produces another audio at another listening/viewing zone. For each of multiple images generated from the multiple visual contents, the processor, using the visual mapping, identifies a bundle of beamlets from each of the MV pixels directed to one listening/viewing zone to form the image. The bundle of beamlets directed to one listening/viewing zone to form one image is different from the bundle of beamlets directed to another listening/viewing zone to form another image. The processor outputs control signaling for the audio source and the MV pixels, wherein the control signaling defines production of the audio generated from each of the multiple audio contents at the corresponding listening/viewing zone, and defines color and brightness of each of the beamlets in each bundle to project the corresponding image to the corresponding listening/viewing zone. The audio source, in response to the control signaling from the processor, produces the multiple audio based on the multiple audio contents at the multiple listening/viewing zones, respectively. The MV pixel(s), in response to the control signaling from the processor, project the multiple images to the multiple listening/viewing zones, respectively.

The audio-visual system constructed as described above uses an audio mapping that translates between the audio source of multiple audio and the listening/viewing zone coordinate system, in which multiple listening/viewing zones are specified, and uses a visual mapping that translates between the beamlet coordinate system, in which beamlets are emitted in different directions from each of the MV pixels, and the listening/viewing zone coordinate system. Multiple audio and visual contents are associated with the multiple listening/viewing zones, respectively. The audio-visual system uses the audio mapping to identify an audio parameter value to produce an audio at a corresponding listening viewing zone, and uses the visual mapping to identify a bundle of beamlets from each of the MV pixels directed to the corresponding listening/viewing zone to form an image. The audio-visual system is capable of performing the same operation for each of the multiple listening/viewing zones, to produce multiple (e.g., different) audio respectively at the multiple listening/viewing zones and to project multiple (e.g., different) images respectively at the multiple listening/viewing zones. Thus, a customized set of an audio content and an image is produced at each listening/viewing zone.

In some embodiments, the audio source is a directional sound source configured to directionally produce the multiple audio at the multiple listening/viewing zones, respectively. For example, the audio source may comprise ultrasound waves configured to carry the multiple audio to be produced at the multiple listening/viewing zones, respectively. As further examples, the audio source may comprise a beam steering system configured to electronically steer the multiple audio to the multiple listening/viewing zones, respectively, or a mechanical steering system configured to mechanically steer the audio source or an audio reflector associated with the audio source to point each of the multiple audio to the corresponding listening/viewing zone.

In other embodiments, the audio-visual system includes multiple audio players, such as earbuds or headsets, which are respectively associated with the multiple listening viewing zones. The control signaling for the audio source directs the multiple audio players to produce the multiple audio, respectively. In some embodiments, the audio-visual system includes a sensor configured to identify the multiple listening/viewing zones and send the specification of the multiple listening/viewing zones to the input node. For example, the sensor may detect locations of the multiple audio players and specify the detected locations of the multiple audio players as the multiple listening/viewing zones. In these examples, the audio-visual system may track locations of the multiple audio players (e.g., headsets worn by multiple listeners/viewers) and continue to deliver audio and visual contents to the listeners/viewers as they move around in the listening/viewing zone coordinate system.

When the sensor is used to identify locations of multiple targets (e.g., audio players) that are moving, the input node of the audio-visual system may receive a new specification of new multiple listening/viewing zones based on the identified locations of the multiple targets that have moved. The processor associates multiple audio and visual contents with the new multiple listening/viewing zones, respectively, and, using the audio and visual mappings, identifies an audio parameter value to produce the audio at one new listening/viewing zone, and identifies a bundle of beamlets from each of the MV pixels directed to each new listening/viewing zone to form the image. The audio-visual system is capable of producing the multiple audio at and projecting the multiple images to the new multiple listening/viewing zones, respectively. The multiple audio and visual contents associated with the new multiple listening/viewing zones may be updated from the multiple audio and visual contents previously associated with the (old) multiple listening/viewing zones.

In a further aspect, a display method is provided, which generally corresponds to an operation of the audio-visual system described above. The method includes generally eight steps:

1) receiving a specification of multiple listening/viewing zones located in a listening/viewing zone coordinate system, from which one or more multi-view (MV) pixels is viewable, and each MV pixel is configured to emit beamlets in different directions in a beamlet coordinate system;

2) associating multiple audio and visual contents with the multiple listening/viewing zones, respectively;

3) determining an audio mapping that translates between the listening/viewing zone coordinate system and an audio source;

4) for each of multiple audio generated from the multiple audio contents, using the audio mapping, identifying an audio parameter value to produce the audio at one listening/viewing zone, wherein the audio parameter value that produces one audio at one listening/viewing zone is different from the audio parameter value that produces another audio at another listening/viewing zone;

5) determining a visual mapping that translates between the listening/viewing zone coordinate system and the beamlet coordinate system;

6) for each of multiple images generated from the multiple visual contents, using the visual mapping, identifying a bundle of beamlets from each of the MV pixels directed to one listening/viewing zone to form the image, wherein the bundle of beamlets directed to one listening/viewing zone to form one image is different from the bundle of beamlets directed to another listening/viewing zone to form another image;

7) generating control signaling for the audio source and the MV pixels, the control signaling defining production of the audio generated from each of the multiple audio contents at the corresponding listening/viewing zone and defining color and brightness of each of the beamlets in each bundle to project the corresponding image to the corresponding listening/viewing zone; and 8) in response to the control signaling, producing the multiple audio based on the multiple audio contents at the multiple listening/viewing zones, respectively, and projecting, from the MV pixels, the multiple images to the multiple listening/viewing zones, respectively.

According to various embodiments, the audio-visual system may provide two or more personalized audio-visual experiences in the listening/viewing area of a shared display. The visual display is provided by a multi-view display which can simultaneously and independently direct unique images to each viewer or group of viewers based on their locations relative to the display. Audio is provided by a sound system which can deliver audio independently and simultaneously to each person or group. The locations of the audio and the visual experiences are registered such that listeners/viewers experience a coordinated presentation, showing the appropriate visuals synchronized in time and space, with the appropriate audio.

BRIEF DESCRIPTION OF THE SEVERAL VIEWS OF THE DRAWINGS

In the drawings, identical reference numbers identify similar elements. The sizes and relative positions of elements in the drawings are not necessarily drawn to scale.

DETAILED DESCRIPTION

In the following description, for purposes of explanation, numerous specific details are set forth in order to provide a thorough understanding of the present invention. It will be evident, however, to one skilled in the art, that the present invention may be practiced without these specific details. In other instances, well-known circuits, structures, and techniques are not shown in detail, but rather in a block diagram, in order to avoid unnecessarily obscuring an understanding of this description. Thus, the specific details set forth are merely exemplary. Particular implementations may vary from these exemplary details and still be contemplated to be within the scope of the present invention. Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

Figure 1:
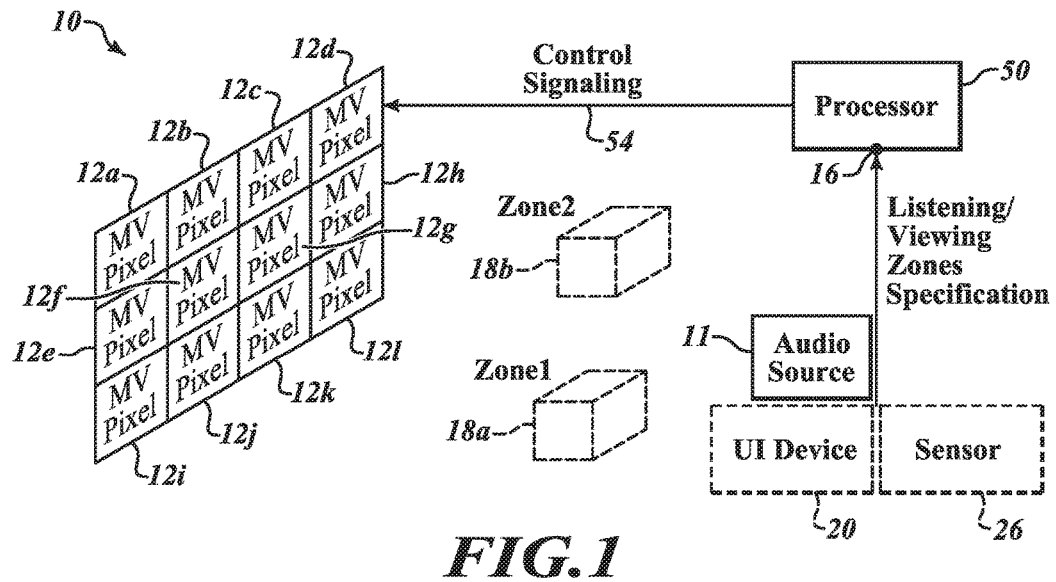
FIG. 1 depicts an embodiment of an audio-visual system.
Figure 6:
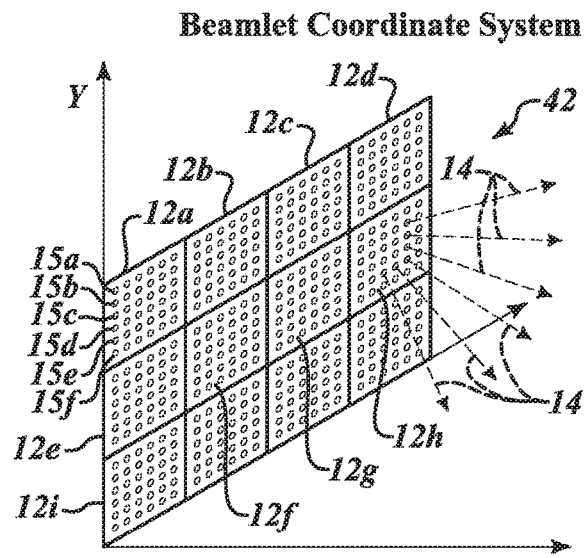
FIG. 6 depicts a beamlet coordinate system according to an embodiment.

FIG. 1 is a system diagram depicting an embodiment of an audio-visual system 10. The audio-visual system 10 includes an audio source 11, one or more multi-view (MV) pixels 12 (twelve MV pixels 12a-12l are included in the illustrated example), wherein each MV pixel 12 is configured to emit beamlets 14 in different directions in a beamlet coordinate system 42, as depicted in FIG. 6.

"Beamlets" as used herein means individually controllable beams emitted from an MV pixel. FIG. 6 illustrates one of the MV pixels 12a-12l emitting multiple beamlets 14 in multiple directions. Unlike an image projector that emits a number of light beams to form an image on a screen, the beamlets 14 from each MV pixel 12 are intended to fall upon the eyes of multiple viewers, such that the multiple viewers respectively see different beamlets (e.g., in different colors and brightness) originating from the same MV pixel 12. As a consequence, the appearance of each MV pixel 12 from the perspective of a viewer is dependent upon the angle at which the viewer looks to the MV pixel 12. Further details of the configuration and operation of the MV pixel 12 may be found in co-pending patent application Ser. No. 15/469,220 ("the '220 application"), filed Mar. 24, 2017, which is incorporated herein by reference. For ease of illustration the MV pixel 12h is depicted to emit a few beamlets 14 in FIG. 6, though it should be understood that many more beamlets 14 may be emitted from the MV pixel 12h and from any of the other MV pixels 12. Further for ease of illustration the MV pixels 12a-12l in FIG. 6 are not depicted to include lenses, which may be added to render beamlets 14 directional as disclosed in the '220 application. The beamlet directionality can be created using not just lenses, but parallax barriers, directional backlights, etc.

Figure 3:
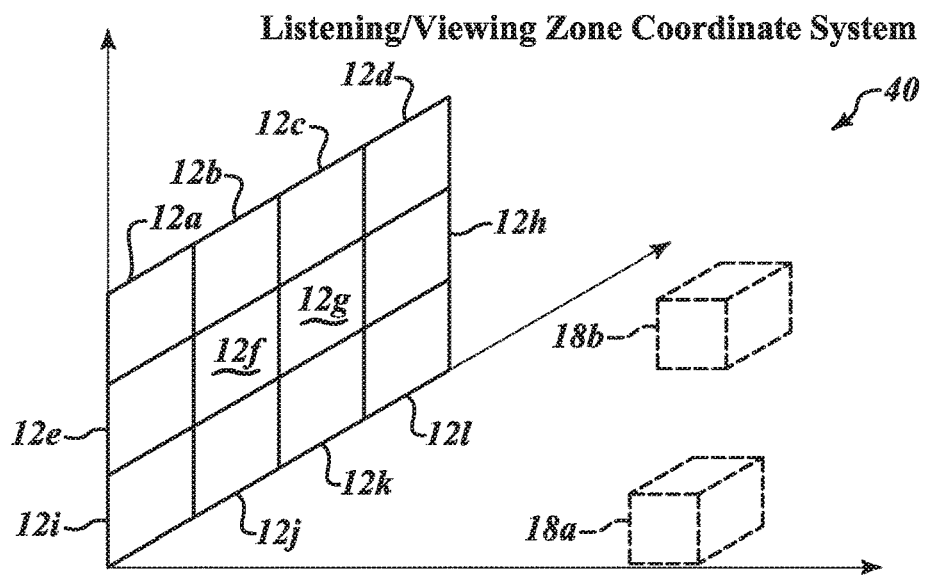
FIG. 3 depicts a listening/viewing zone coordinate system in 3D according to an embodiment.

Referring back to FIG. 1, the audio-visual system 10 includes an input node 16 which, in operation, receives a specification of multiple listening/viewing zones 18a ("ZONE 1") and 18b ("ZONE 2") located in a listening/viewing zone coordinate system 40, as additionally depicted in FIG. 3. The input node 16 permits receiving information, data, and/or signaling from other devices or systems (e.g., UI devices, sensors, storage devices, content servers) via any suitable medium including wireline and/or wireless medium, and via any suitable protocol (e.g., Bluetooth, Wi-Fi, cellular, optical, ultrasound).

FIG. 3 illustrates the two listening/viewing zones 18a and 18b, respectively specified as three-dimensional volumes (e.g., boxes), located in the listening/viewing zone coordinate system 40, for example, relative to the one or more MV pixels 12a-12l. Each listening/viewing zone 18 defines an observation point at which a personalized (individualized) audio generated by the audio source 11 is audible, and an image formed by the one or more MV pixels 12a-12l is visible. Thus, the listening/viewing zone 18 may be defined as a three-dimensional volume (a collection of observation points in 3D), as a two-dimensional area (a collection of observation points in 2D), or as a point.

The listening/viewing zone coordinate system 40 may be any suitable coordinate system, such as a Cartesian coordinate system, or a polar coordinate system in which multiple listening/viewing zones are positioned to surround the one or more MV pixels or the audio source 11, for example. Any suitable 3D space modeling method may be used to define the listening/viewing zone coordinate system 40, such as a map, point cloud, wire polygon mesh, and textured polygon mesh. In some embodiments, the listening/viewing zone coordinate system 40 may be based on the physical dimensions of a listening/viewing area in which the multiple listening/viewing zones 18 are defined.

In some embodiments, the listening/viewing zone coordinate system 40 may be within sight of a 3D sensor attached to the MV pixels (e.g., a depth sensor, a stereoscopic camera) and the listening/viewing zone coordinate system 40 can be the 3D coordinate system of the 3D sensor. For example, a real-life 3D environment is scanned by a 3D sensor (e.g., stereoscopic camera) to derive the 3D listening/viewing zone coordinate system 40, in which multiple listening/viewing zones may be specified.

Figure 4:
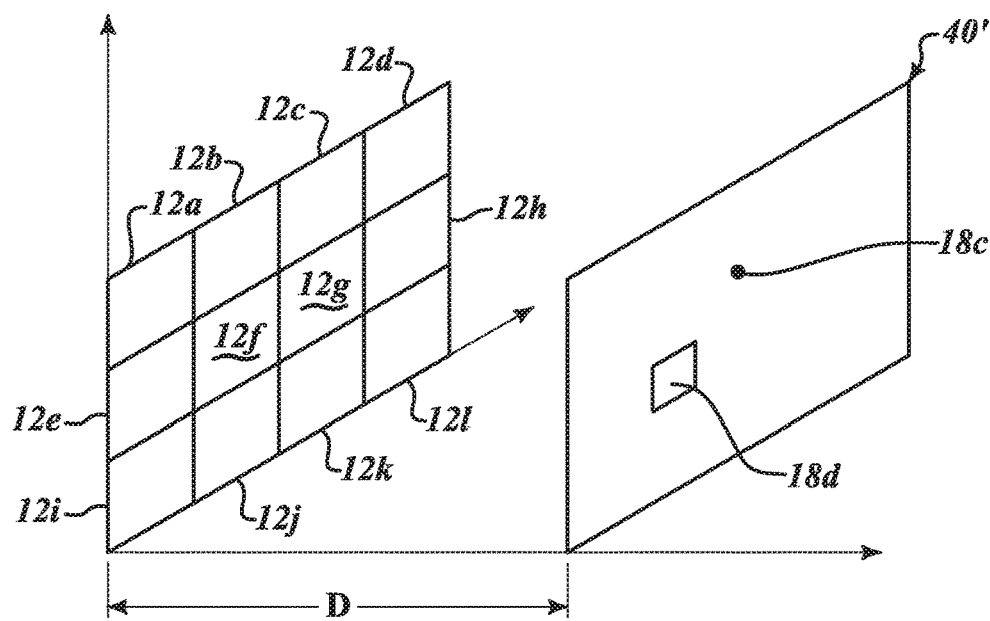
FIG. 4 depicts a listening/viewing zone coordinate system in 2D according to an embodiment.

In other embodiments, the listening/viewing area may be within sight of a 2D camera attached to the MV pixels, wherein the 2D camera is used as a sensor to identify the multiple listening/viewing zones. In this case the listening/viewing zone coordinate system 40 is based on the 2D pixel coordinate system of the 2D camera. For example, FIG. 4 illustrates a sample listening/viewing zone coordinate system 40' in 2D, which may be based on the 2D pixel coordinate system of the 2D camera (not shown). In this example, the 2D listening/viewing zone coordinate system 40' is set on a plane at a distance D from the one or more MV pixels 12a-12l. A point 18c or an area 18d may be specified in the 2D listening/viewing zone coordinate system 40' to represent a listening/viewing zone. It is noted that the 2D listening/viewing zone coordinate system 40' may be in a shape other than a plane, such as a hemisphere or other non-planar surface. In some embodiments, it may be desirable for each point in the 2D listening/viewing zone coordinate system 40' to have a unique viewing angle to the MV pixels 12a-12l, such that the bundle of beamlets directed towards each listening/viewing zone, which is formed of one or more of those points each having a unique viewing angle, can be uniquely identified. Then, multiple non-overlapping listening/viewing zones in the 2D listening/viewing zone coordinate system 40' may be associated with (or "hit" by) mutually exclusive bundles of beamlets.

Figure 5A:
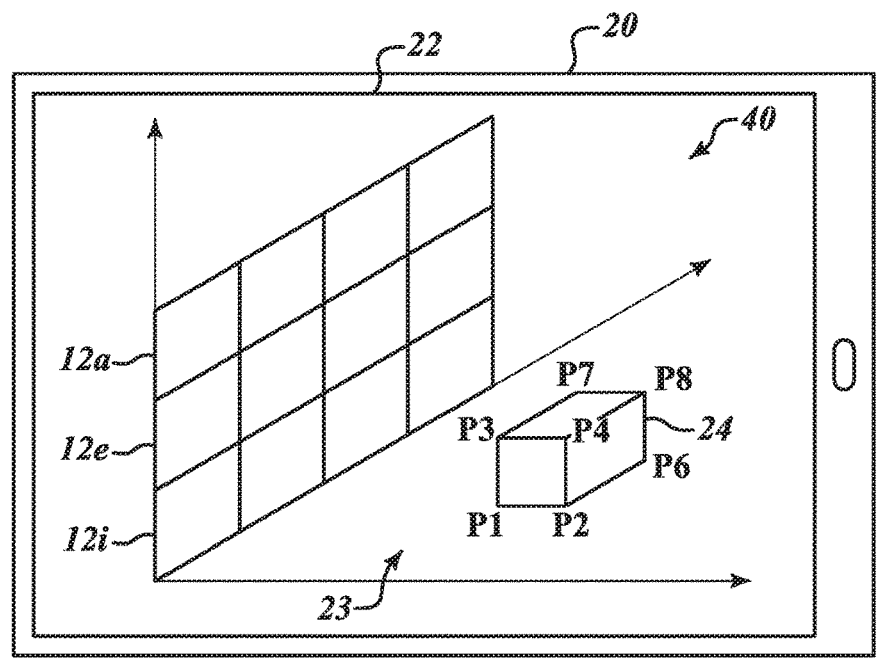
FIG. 5A depicts a sample screen view of a user interface device usable to specify multiple listening/viewing zones in a listening/viewing area relative to the MV pixel(s).

Multiple listening/viewing zones 18 may be specified in various ways. According to some embodiments, the audio-visual system 10 may include a user-interface (UI) device 20 which, in operation, receives an operator specification of the multiple listening/viewing zones 18 and sends the specification of the multiple listening/viewing zones to the input node 16, as shown in FIG. 1. FIG. 5A illustrates a sample UI device 20, which includes a screen 22 (e.g., touchscreen) capable of displaying a representation of a listening/viewing area 23 relative to the one or more MV pixels 12a-12l in the listening/viewing zone coordinate system 40. The UI device 20 in these embodiments may be any of a tablet computer, as depicted in FIG. 5A, a laptop or desktop computer, or any electronic device that includes a screen (e.g., smartphone) and is capable of running a listening/viewing zone specification application configured to permit specification of multiple listening/viewing zones 18 in the listening/viewing area 23. The operator may specify a listening/viewing zone in the listening/viewing area 23 in the listening/viewing zone coordinate system 40 via the screen 22 (e.g., touchscreen) or keyboard or any other input device (not shown) of the UI device 20.

The operator may specify each listening/viewing zone graphically, for example, by "drawing" a point, a 2D shape (e.g., a polygon, circle, oval, freeform shape) and/or a 3D shape (e.g., a box, sphere) that represents an observation point or represents (e.g., encloses) a collection of observation points. In the illustrated example of FIG. 5A, the operator has drawn a 3D shape of a box 24 that encloses a collection of observation points, from which a particular image should be visible and a particular audio should be audible. The graphically-input multiple listening/viewing zones 18 may be represented as shapes or other indicia superimposed on the listening/viewing area 23 on the screen of the UI device 20. Additionally or alternatively, the operator may specify the multiple listening/viewing zones 18 by text, for example, by entering the coordinates of the vertices (P1-P8) of a box 24 that defines each listening/viewing zone via a keyboard of the UI device 20.

In some embodiments, the UI device 20 need not include a screen capable of displaying a listening/viewing area, for example, when the operator may not require a visualization of the listening/viewing area in order to specify multiple listening/viewing zones. In these embodiments, the UI device 20 need only include a component configured to receive the operator specification of multiple listening/viewing zones. The component may be, without limitation, a keyboard or keypad on which the operator may type indications (e.g., seat numbers, section numbers) corresponding to listening/viewing zones; a microphone into which the operator may speak indications of listening/viewing zones; a touch/gesture-sensitive pad on which the operator may tap/gesture indications of listening/viewing zones; an optical pointer the operator may use to point into the listening/viewing area to specify each listening/viewing zone, etc.

Figure 5B:
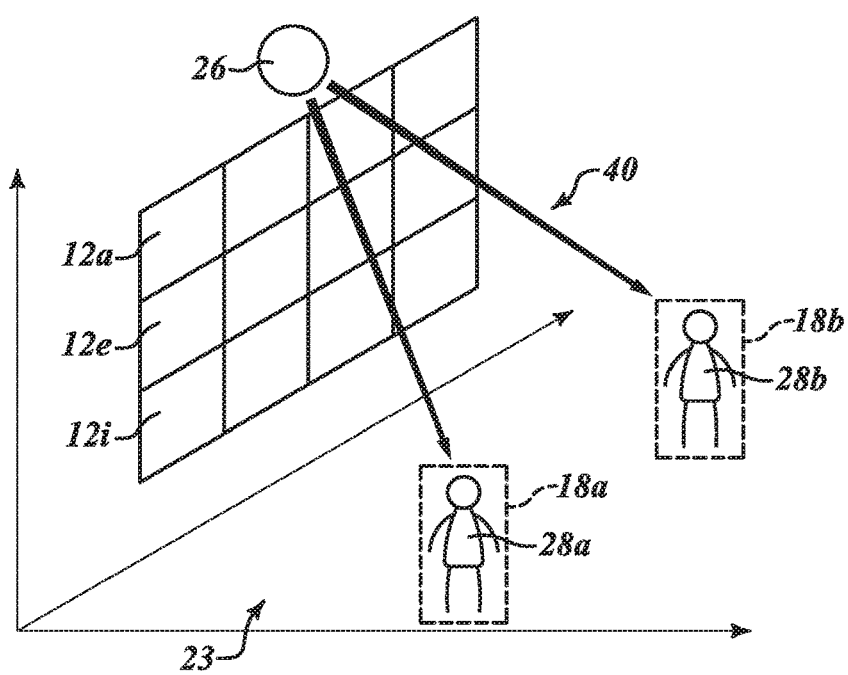
FIG. 5B depicts sample use of a sensor to specify multiple listening/viewing zones based on multiple targets whose locations are identified by the sensor.

According to other embodiments, the audio-visual system 10 may include a sensor 26 configured to identify the multiple listening/viewing zones 18 and to send the specification of the multiple listening/viewing zones to the input node 16, as shown in FIG. 1. FIG. 5B illustrates a sample sensor 26, which can identify (e.g., detect) locations of multiple targets 28a and 28b and specify the identified locations of the multiple targets 28a and 28b as the multiple listening/viewing zones 18a and 18b in the listening/viewing zone coordinate system 40. The sensor 26 may be based on any suitable sensing technology including, without limitation, an optical sensor (e.g., camera, video camera, infrared sensor, depth sensor), an electromagnetic (EM) interrogation system sensor capable of tracking an active object, a GPS system sensor capable tracking an active object, an RF sensor (e.g., RFID system including a reader capable of interrogating an RFID tag), an RF triangulation technique-based sensor, a proximity sensor, a thermal sensor, a radar sensor, and a system that tracks acoustic emissions. In some embodiments multiple sensors may be used, which are suitably located relative to each other and relative to the listening/viewing area 23 to identify multiple listening/viewing zones that may be specified in the listening/viewing area 23. Multiple sensors of the same type, or of different types, may be used together.

For example, one or more cameras having suitable lenses and lighting may be used as a sensor that can recognize and locate multiple targets 28 to correspondingly specify the multiple listening/viewing zones 18. In some embodiments, the camera(s) may be depth-aware cameras, such as structured light or time-of-flight cameras, which can generate a depth map of what is being seen through the camera at a short range. The depth map may then be processed to approximate a 3D representation of what is being seen. In other embodiments, the camera(s) may be stereoscopic cameras and/or LIDAR sensors.

In the illustrated example of FIG. 5B, the sensor 26 detects locations of potential viewers as the multiple targets 28a and 28b, and specifies the detected locations of the viewers as the multiple listening/viewing zones 18a and 18b. For example, a point, a 2D shape and/or a 3D shape may be assigned to each detected target 28 (e.g., a 3D box that encloses the target 28), and the assigned point, 2D shape and/or 3D shape may be used to specify the listening/viewing zone 18 of the target 28. The processing to specify multiple listening/viewing zones based on the locations of the multiple targets 28a, 28b identified by the sensor 26 may be performed by a processor of the sensor 26 and/or a processor 50 of the audio-visual system 10, to be described below.

In further embodiments, the sensor may be configured to identify (e.g., pick up) attributes of the listening/viewing zone, such as audio (e.g., speech or other sound made by a viewer or viewer surrogate), temperature (e.g., heat emanating from a viewer or viewer surrogate), etc. The identified attributes may be used, for example, by a zones-and-contents association module 36 of the processor 50, to be described below, to select or generate appropriate audio and visual content for the listening/viewing zone (e.g., a cold drink advertisement selected/generated for a viewer in a high-temperature listening/viewing zone).

FIG. 6 schematically depicts the beamlet coordinate system 42, which may be any suitable coordinate system such as a Cartesian coordinate system and a polar coordinate system. The beamlet coordinate system 42 identifies each of the beamlets emitted from each MV pixel 12, which follows a specific propagation path. For example, the propagation path of each beamlet may be defined by the beamlet's origin in the MV pixel and the (unit) vector that defines its propagating direction, or may be characterized by a combination of angles such as azimuth α and altitude ß angles formed by the beamlet. As further examples, any suitable 3D space modeling method may be used to define the beamlets' propagation paths in the beamlet coordinate system 42, such as a point cloud method that specifies a set of data points that form each propagation path or a voxel data method that specifies a set of voxels (a volume having unit x-y-z dimensions) that form each propagation path. Other 3D modeling methods may be used, such as a 3D map, wire polygon mesh, and textured polygon mesh. In some embodiments, as illustrated in FIG. 6, the beamlet coordinate system 42 explicitly identifies each of the beamlets by the beamlet's origin 15a, 15b, 15c . . . , in each MV pixel 12a, wherein each beamlet's origin is implicitly associated with its propagation path. In other embodiments, the beamlet coordinate system 42 may explicitly identify each of the propagation paths of the beamlets.

In some embodiments, the propagation path of each beamlet may be found based on a geometric model of the one or more MV pixels. For example, the geometric definitions of and relationships among the beamlets of an MV pixel may be found in a factory via calibration measurements, or may be inferred from the opto-mechanical design of the MV pixel, such as a known radial distortion of a lens included in the MV pixel. In various embodiments, the beamlets (e.g., the sources of the beamlets) in each MV pixel are arranged in a geometric array (e.g., 2D array, circular array). Propagation paths of the beamlets arranged in a geometric array can be geometrically defined using any suitable mathematical techniques including, without limitation, linear interpolation; linear extrapolation; non-linear interpolation; non-linear extrapolation; Taylor-series approximation; linear change of reference frame; non-linear change of reference frame; polynomial, spherical and/or exponential models; and trigonometric manipulation. As a particular example, once the propagation paths of selected beamlets are geometrically defined, suitable interpolation techniques may be used to find the propagation paths of the beamlets between those geometrically-defined beamlets. In other embodiments, the propagation path of each beamlet may be found by flashing image calibration patterns on the MV pixels (e.g., by selectively turning on and off the beamlets on each MV pixel) to uniquely encode every beamlet, and capturing the images of the flashing image calibration patterns using a calibration device camera placed at different locations in a listening/viewing area of the MV pixels. The captured images can then be plotted onto the beamlet coordinate system 42 to geometrically define respective propagation paths of the beamlets. That is, the images captured at the different locations are processed to determine which beamlet path/direction of the MV pixel best intersects with a corresponding location, and the locations respectively correlated with the beamlet directions are stored as calibration points, which will be used to determine a visual mapping that translates between the listening/viewing zone coordinate system 40 and the beamlet coordinate system 42, as will be more fully described below. Various encoding patterns may be used as the flashing image calibration patterns, including, without limitation, Gray-code patterns, non-return-to-zero (NRZ) digital sequences, amplitude-shift-keyed (ASK) bits, maximum-length sequences, and shift-register sequences.

Although beamlets 14 are depicted in the accompanying figures as simple lines with arrowheads indicating their directions of emission, they can have an angular component and can be in any shape. Thus, characterization of the beamlet as a simple line is an approximation, which is a valid model in some embodiments but in other embodiments the beamlet may be modeled as having a shape similar to the beam from a search light, for example. In various exemplary embodiments, each beamlet 14 is wide/large enough such that both eyes of a viewer are expected to be within the beamlet 14 and the beamlet 14 falls upon both eyes of the viewer. Thus, the viewer sees the same beamlet 14 (e.g., the same color and brightness) with both of the eyes. In other embodiments, each beamlet 14 is narrow/small enough such that two different beamlets 14 are individually controlled to fall upon two eyes of a viewer, respectively. In this case the viewer sees two beamlets 14 of possibly different colors and/or brightness with his/her two eyes, respectively.

Figure 2:
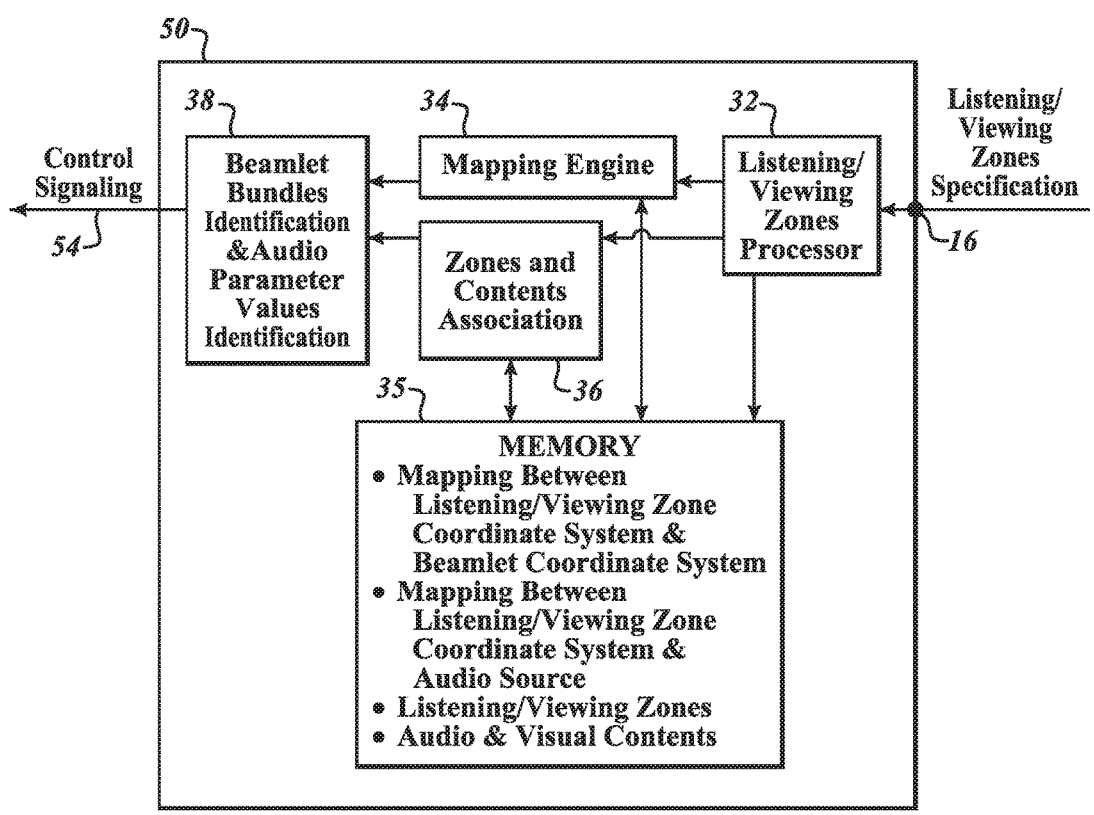
FIG. 2 depicts an embodiment of a processor of the audio-visual system.

Returning to FIG. 1, the audio-visual system 10 includes the processor (controller) 50 coupled to the input node 16. Referring additionally to FIG. 2, the processor 50 may be a general-purpose computer capable of, among other tasks, executing an operating system, executing device drivers, and executing specialized application software used in conjunction with various embodiments of the invention. In some embodiments, the processor 50 may be a special-purpose processor. Although the processor 50 is illustrated as a single device, in some embodiments, the functionality of the processor 50 may be distributed amongst multiple devices, such as between a host processor and a processor included in an MV display device, or among a host processor and two or more processors of two or more MV display devices.

The processor 50 is capable of populating, updating, using and managing data in a processor-accessible memory 35, which is illustrated as part of the processor 50 in FIG. 2 though may be provided external to the processor 50 in some embodiments. Briefly, the memory 35 is a volatile storage device (e.g., RAM) and/or a non-volatile, non-transitory storage device (e.g., ROM, EPROM, EEPROM, hard drive (s), flash drive(s) or other solid state memory technology, CD-ROM, DVD) capable of storing, among any other information, data, device drivers (e.g., for sending audio and visual control signaling 54 to the audio source 11 one or more MV pixels 12), and specialized application software which, when executed, enable the processor 50 to perform various computations and processing as described in the present disclosure. Although the memory 35 is illustrated as a single device, in various embodiments, the memory 35 may be divided into multiple storage devices.

The processor 50 receives, via the input node 16, the specification of the multiple listening/viewing zones 18a and 18b, for example, from the UI device 20 (see FIG. 5A) or from the sensor 26 (see FIG. 5B).

The processor 50 associates multiple audio and visual contents with the multiple listening/viewing zones 18a and 18b. This may be done by associating the multiple audio and visual contents themselves with the multiple listening/viewing zones 18a and 18b, or by associating multiple content descriptors, such as multiple content providers (e.g., cable channels, movie channels, live stream sources, news websites, social websites) or multiple content types, with the multiple listening/viewing zones 18a and 18b.

The processor 50 determines (e.g., identifies, accesses) a visual mapping that translates between the listening/viewing zone coordinate system 40 and the beamlet coordinate system 42 (FIG. 6). In various embodiments, a visual mapping between the listening/viewing zone coordinate system 40 and the beamlet coordinate system 42 is generated and stored (or pre-stored) in the memory 35, which the processor 50 may access. In other embodiments, the processor 50 may generate a visual mapping between the listening/viewing zone coordinate system 40 and the beamlet coordinate system 42 during runtime using a real-time calibration process.

The visual mapping may take any of various forms, such as a table or a mathematical relationship expressed in one or more translational functions. In some embodiments, the visual mapping may be based on registration of reference indicia (e.g., points, lines, shapes) defined in the listening/viewing zone coordinate system 40 and in the beamlet coordinate system 42. For example, a first camera attached to the one or more MV pixels 12 is used to capture images of a listening/viewing area 23 of the MV pixels 12. A registration/calibration device (not shown) including a second camera and a light source (e.g., an LED) is placed in the listening/viewing area, and the light source is flashed, which is captured by the first camera of the MV pixels 12. The location of the flashing light in the listening/viewing area as imaged by the first camera may serve as a reference in the listening/viewing zone coordinate system 40 (which may be based on the coordinate system of the first camera). Encoding patterns or image calibration patterns (e.g., Gray-code patterns, non-return-to-zero (NRZ) digital sequences, amplitude-shift-keyed (ASK) bits, maximum-length sequences, shift-register sequences) are flashed on the one or more MV pixels (by selectively turning on and off the beamlets on each MV pixel) to uniquely encode every beamlet emitted from each MV pixel. The beamlet from each MV pixel that is captured by the second camera of the registration/calibration device placed in the listening/viewing area may be uniquely identified (because each beamlet is uniquely encoded) and used as a reference in the beamlet coordinate system 42. The same process may be repeated with the registration/calibration device moved to different locations in the listening/viewing area, to thereby obtain a set of references in the listening/viewing zone coordinate system 40 and a set of references in the beamlet coordinate system 42. The visual mapping that translates between the two coordinate systems 40 and 42 may be found so as to register, align or otherwise correlate these two sets of references in the two coordinate systems. Specifically, images of the encoding patterns (image calibration patterns) captured by the second camera of the registration/calibration device at different locations in the listening/viewing zone coordinate system 40 are processed to determine which beamlet direction of the MV pixel best intersects with a corresponding location of the second camera, and the locations respectively correlated with the beamlet directions are stored as calibration points. The calibration points are used to create a registration model, or the visual mapping, which relates the beamlet directions in the beamlet coordinate system 42 to the listening/viewing zone coordinate system 40. Any other registration techniques in image processing, such as automatic 3D point cloud registration, may also be used to perform the registration.

Figure 7A:
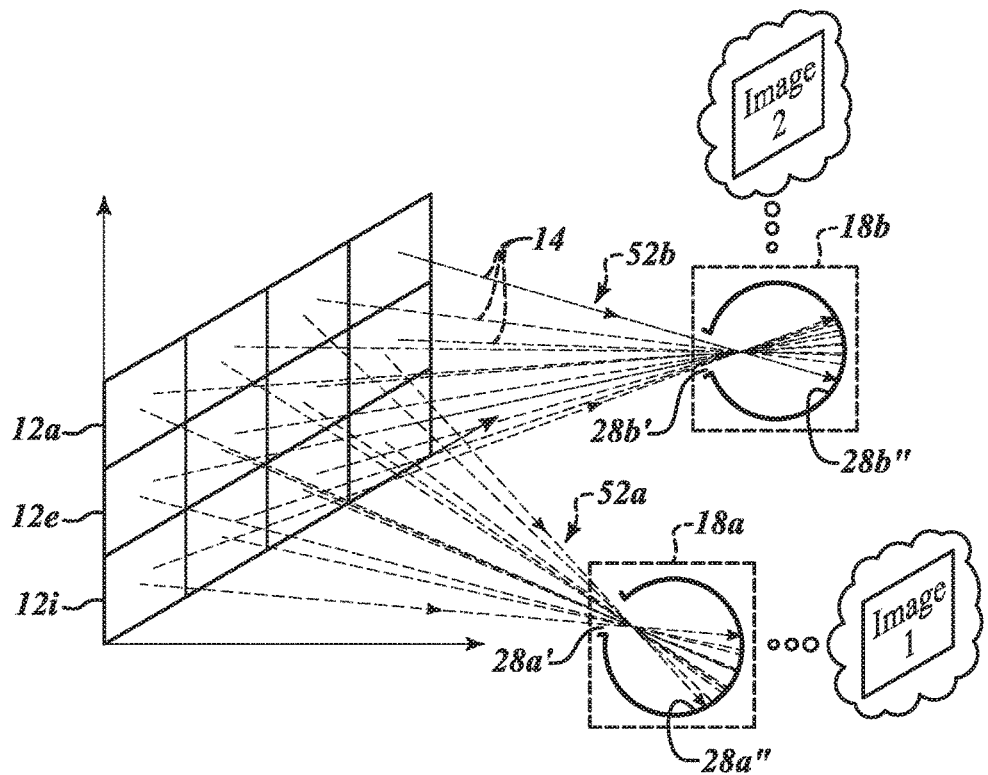
FIG. 7A depicts a sample process of using a visual mapping, which translates between the listening/viewing zone coordinate system and the beamlet coordinate system, to identify a bundle of beamlets from the one or more MV pixels directed to each of the multiple listening/viewing zones to form a corresponding image.

As illustrated in FIG. 7A, for each of multiple images ("IMAGE 1" and "IMAGE 2") generated from the multiple visual contents, the processor 50, using (applying) the visual mapping determined (e.g., identified, accessed, generated) above, identifies a bundle of beamlets 14 from each of the MV pixels 12*a*-12*l* directed to one listening/viewing zone 18 to form the image. As illustrated, each bundle 52*a* or 52*b* includes the beamlets 14 that are "hitting" the pupil 28*a*' or 28*b*' and spread to the retina 28*a*" or 28*b*" of the viewer 28*a* or 28*b* to form "IMAGE 1" or "IMAGE 2" in each viewer's brain. The bundle 52*a* of beamlets 14 directed to the pupil 28*a*' in one listening/viewing zone 18*a* to form one image "IMAGE 1" in the viewer 28*a*'s brain is different from the bundle 52*b* of beamlets 14 directed to the pupil 28*b*' in another listening/viewing zone 18*b* to form another image "IMAGE 2" in the viewer 28*b*'s brain. As shown in FIG. 1, the processor 50 outputs control signaling 54 for the MV pixels 12*a*-12*l*. The control signaling 54 defines color and brightness (and any other imaging parameters as desired) of each of the beamlets 14 in each bundle 52 to project the corresponding image to the corresponding listening/viewing zone 18. The MV pixels 12*a*-12*l*, in response to the control signaling 54 from the processor 50, project the multiple images to the multiple listening/viewing zones, respectively. For ease of illustration the MV pixels 12*a*-12*l* in FIGS. 7A-7C are not depicted to include lenses, which may be added to render beamlets 14 directional; the beamlet directionality can be created using not just lenses, but parallax barriers, directional backlights, etc.

Figure 7B:
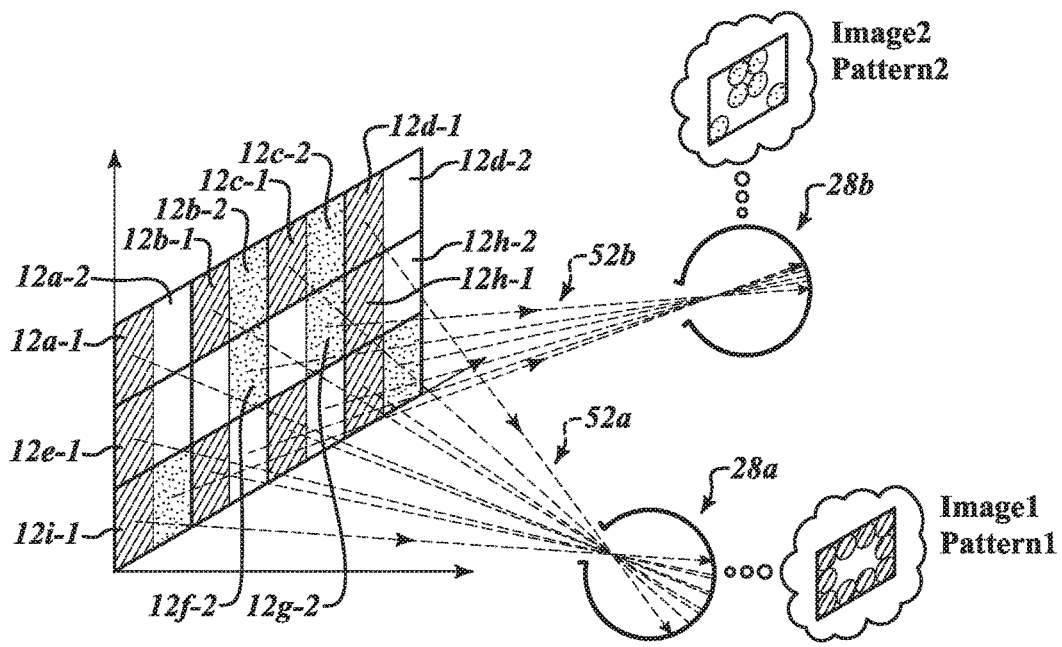
FIG. 7B depicts an example in which the MV pixels project different bundles of beamlets to different listening/viewing zones, respectively, to present different images (IMAGE 1 and IMAGE 2 having different patterns) to the eyes located at the listening/viewing zones.
Figure 7C:
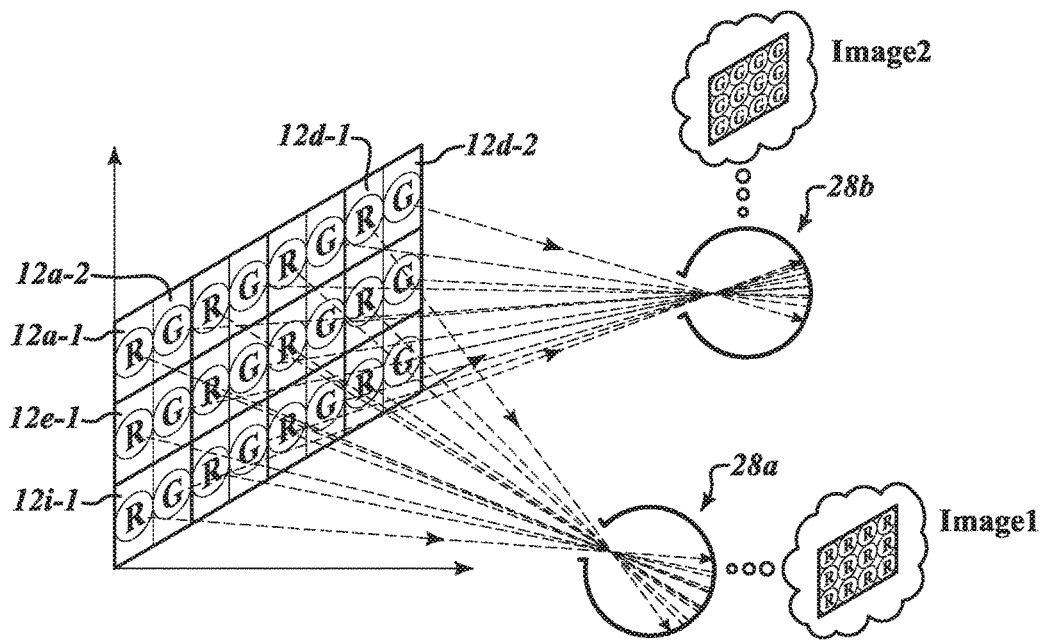
FIG. 7C depicts another example in which the MV pixels project different bundles of beamlets to different listening/viewing zones, respectively, to present different images (IMAGE 1 and IMAGE 2 having different colors) to the eyes located at the listening/viewing zones.

FIGS. 7B and 7C depict examples in which the MV pixels 12*a*-12*l* function to form two different images for two different viewers located at two listening/viewing zones. In FIGS. 7B and 7C, each MV pixel is divided into two sections (e.g., 12*a*-1 and 12*a*-2), and it is assumed that the first sections (12*a*-1, 12*b*-1, 12*c*-1, et seq.) emit beamlets directed to the first listening/viewing zone where the viewer (or the viewer's eye) 28*a* is located, while the second sections (12*a*-2, 12*b*-2, 12*c*-2, et seq.) emit beamlets directed to the second listening/viewing zone where the viewer (or the viewer's eye) 28*b* is located. The control signaling 54 defines color and brightness of each of the beamlets 14 in each bundle to project the corresponding image to the corresponding listening/viewing zone.

In FIG. 7B, the first sections of ten MV pixels that form a rectangular pattern (12*a*-12*d*, 12*e*, 12*h*, and 12*i*-12*l*) emit beamlets having the color and brightness represented by "hatching" to the eye of the viewer 28*a* such that the viewer 28*a* sees IMAGE 1 having Pattern 1. The second sections of six MV pixels (12*b*-12*c*, 12*f*-12*g*, 12*i* and 12*l*) emit beamlets having the color and brightness represented by "blotching" to the viewer 28*b* such that the viewer 28*b* sees IMAGE 2 having Pattern 2 that is different from Pattern 1 of IMAGE 1.

In FIG. 7C, the first sections of all twelve MV pixels (12*a*-12*l*) emit beamlets having the color and brightness represented by "R" to the eye of the viewer 28*a* such that the viewer 28*a* sees IMAGE 1 in red. The second sections of all twelve MV pixels (12*a*-12*l*) emit beamlets having the color and brightness represented by "G" to the viewer 28*b* such that the viewer 28*b* sees IMAGE 2 in green.

In each of these examples, a bundle of beamlets 14 that will "hit" one listening/viewing zone is identified, and the color and brightness of each of the beamlets in the bundle are set, by the control signaling 54, to correspond to the visual content associated with the listening/viewing zone so as to form an image based on the visual content at the listening/viewing zone.

As used herein, "image" means anything that results from a pattern of illumination from the one or more MV pixels 12. The pattern of illumination is generated by turning "on" or "off" each of the beamlets emitted from each MV pixel 12 and/or controlling color and brightness (intensity) of each of the beamlets. Non-limiting examples of an image include any one or a combination of a static image, a stream of images (e.g., video), a text pattern (e.g., messages, signage), a lighting pattern (e.g., beamlets individually or collectively blinked, flashed, e.g., at different or varying speeds, at different brightness/dimness levels, at different brightness/dimness increase or decrease rates, etc., or otherwise turned "on" and "off"), and any other expression of content that is visible to human eyes.

In some embodiments, the control signaling 54 may define, in addition to color and brightness, other parameters of each of the beamlets 14, such as spectral composition, polarization, beamlet shape, beamlet profile, focus, spatial coherence, temporal coherence, and overlap with other beamlets. Specifically, beamlets generally do not have a sharp edge, and thus adjacent beamlets may somewhat overlap. The degree of overlap may be controlled by one of the beamlet parameters.

The control signaling 54 for the MV pixels 12 may be output from the processor 50 via any suitable medium, including wireline and/or wireless medium, and via any suitable protocol (e.g., Bluetooth, Wi-Fi, cellular, optical, ultrasound).

The processor 50 also determines (e.g., identifies, accesses) an audio mapping that translates between the listening/viewing zone coordinate system and the audio source 11. Multiple audio are generated from multiple audio contents based on (e.g., stored in) the audio source 11. For each of the multiple audio generated from the multiple audio contents, using the audio mapping, the processor 50 identifies an audio parameter value to produce the audio at one listening/viewing zone, wherein the audio parameter value that produces one audio at one listening/viewing zone is different from the audio parameter value that produces another audio at another listening/viewing zone.

For example, the audio source 11 may include multiple speakers configured to produce the multiple audio at the multiple listening/viewing zones, respectively. For example, audio parameter values may indicate which of the multiple speakers (e.g., respectively located near the multiple listening/viewing zones) is to produce which of the multiple audio, at the multiple listening/viewing zones respectively. The multiple speakers can be mechanically/physically manipulated or moved about in a space. For example, the multiple speakers may be on motorized gimbals to swivel and point in different directions, on tracks, on mobile bases, or on drones; or have controllable shutters, sound barriers, or baffles. In these cases, audio parameter values may indicate the mechanical/physical control of the multiple speakers, to dynamically deliver differentiated audio to different listening/viewing zones. In some embodiments, MV displays, signals, and lights may also be mechanically/physically manipulated or moved about in a space in association with the multiple speakers.

As another example, the audio source 11 may include a directional sound source configured to directionally produce the multiple audio at the multiple listening/viewing zones, respectively.

One example of a directional sound source includes ultrasound waves configured to carry the multiple audio to be produced at the multiple listening/viewing zones, respectively. Use of ultrasound waves having a relatively smaller wavelength permits use of reasonable size emitters to produce very direction output, as compared with a conventional, relatively large-wavelength (low-frequency) sound emitter which tends to have a large size. In order to create audio in the human hearing range, the ultrasound emitters produce different ultrasonic frequencies to mix at the listening/viewing zone 18*a* or 18*b* to create low-frequency, audible tones. Beam steering techniques may be used to allow the set of ultrasound emitters to carry multiple audio in multiple directions to be audible at the multiple listening/viewing zones 18*a* and 18*b*, respectively. Briefly, beam steering systems can direct audio in electronically steerable directions. They can direct audio from a single sound source, or from multiple sound sources independently and simultaneously. Alternatively, multiple sets of ultrasound emitters may be provided to respectively provide directional audio at the multiple listening/viewing zones 18*a* and 18*b*. Using the audio mapping, to be described in detail below, audio parameter values are identified that produce desired audio at corresponding listening/viewing zones, respectively, based on mixing of ultrasound waves from ultrasound emitters.

Figure 8A:
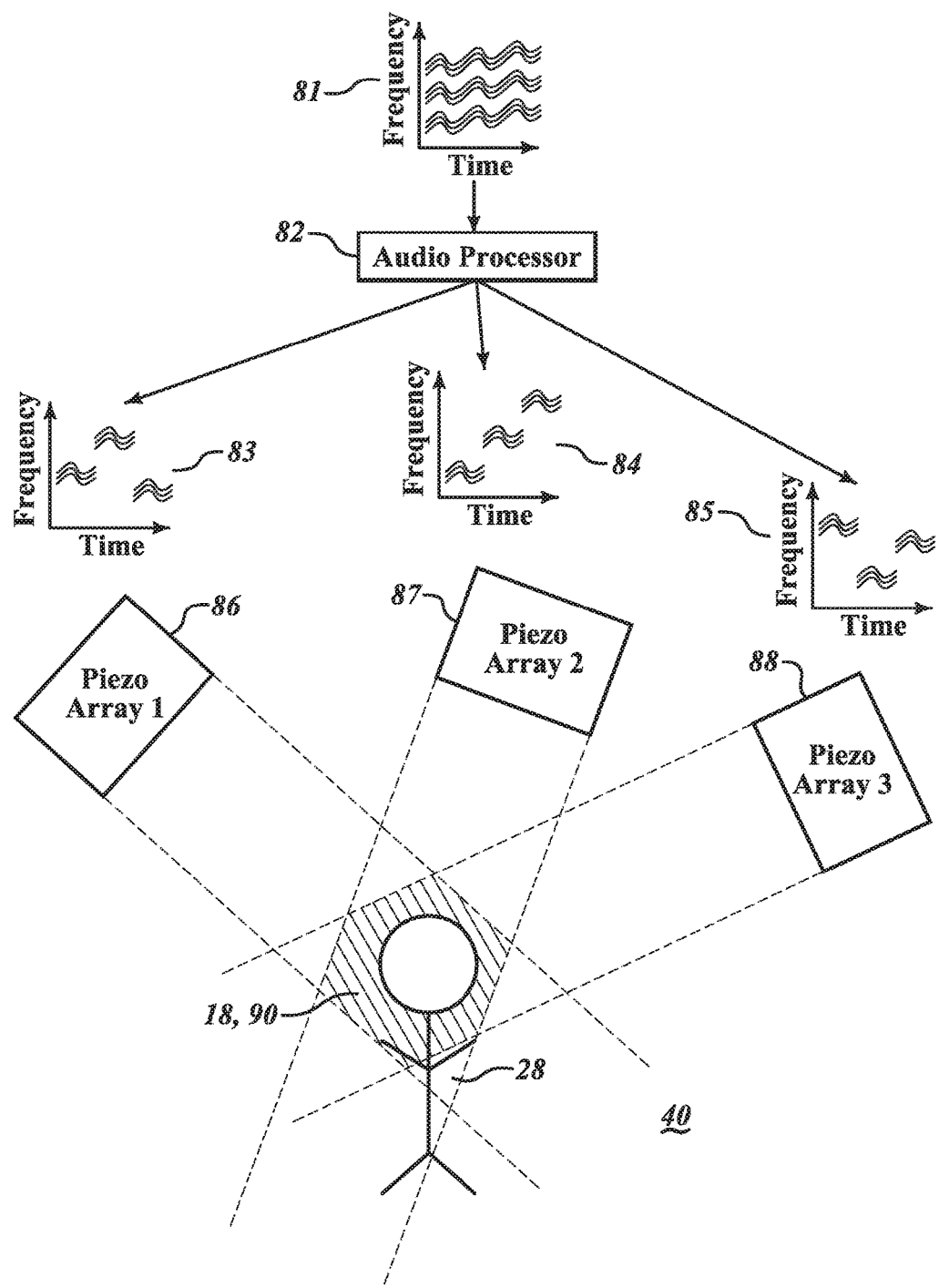
FIG. 8A depicts a sample system and process of using the audio mapping to identify an audio parameter value to produce a corresponding audio at each of the multiple listening/viewing zones as a combination of multiple audio components generated by multiple directional sound emitters.

Another example of a directional sound source includes multiple directional sound emitters configured to carry audio components to be combined at the corresponding listening/viewing zone to produce the corresponding audio. FIG. 8A depicts a sample system and process of using the audio mapping, to be described in more detail below, to identify an audio parameter value to produce a corresponding audio at each of the multiple listening/viewing zones as a combination of multiple audio components respectively generated by multiple directional sound emitters.

FIG. 8A illustrates one listening/viewing zone 18, in which the listener/viewer 28 is present and at which intelligible (audible) sound is created, which is not audible outside the listening/viewing zone. A sound signal 81, represented by its time evolving spectrum, is processed by an audio processor 82, which splits the sound signal 81 into multiple, unintelligible sound components 83, 84, and 85 in time, frequency, or a combination thereof. The sound components 83, 84, and 85, when added together, reproduce the original sound signal 81. On the other hand, each one of these components 83, 84, and 85 contains a piece of the sound signal 81 in changing parts of the spectrum and, therefore, is difficult to understand. These sound components 83, 84, and 85 are fed to directional audio emitters 86, 87, and 88, respectively, which are piezo arrays 1, 2, and 3 in the illustrated embodiment. The directional audio emitters 86, 87, and 88 send out the sound components 83, 84, and 85, respectively, each as a narrow beam. The intersection 90 of the beams (a shaded area in FIG. 8A) defines the listening/viewing zone 18 for the listener/viewer 28 standing there. The listener/viewer 28 hears the sum of the sound components 83, 84, and 85, which reproduces the original sound signal 81. However, a person outside of the listening/viewing zone 18 would only hear a garbling partial signal at best.

Using beam steering techniques, multiple sets of beams can be emitted from the directional audio emitters 86, 87, and 88 to be combined at multiple listening/viewing zones, respectively. Thus, unique audio content can be respectively delivered to multiple intersections, i.e., to multiple listening/viewing zones, simultaneously. In this example, the audio mapping results from calibrating the directional audio emitters 86, 87, and 88 to the listening/viewing zone coordinate system 40. The audio mapping is used to identify one or more audio parameter values that produces a corresponding unique audio at one of the multiple listening/viewing zones as a combination of multiple sound components (83, 84, 85) respectively generated by directional audio emitters (86, 87, 88). For example, the audio parameter values may define respective sound components to be combined, directions and strengths of the beams emitted from respective directional audio emitters, beam steering settings of the respective audio emitters, and so forth. Any suitable beam steering system may be used, which is configured to electronically steer multiple audio beams to multiple listening/viewing zones, respectively. Alternatively or additionally, a mechanical steering system may be used, which is configured to mechanically steer the audio source 11 or an audio reflector associated with the audio source 11 to point each of multiple audio beams to the corresponding listening/viewing zone. A mechanical steering system typically involves mechanically moving a directional audio source to change its pointing direction. Rather than moving the source itself, it is also possible to move an audio reflector. To accommodate multiple listeners/viewers, a setup may involve a plurality of mechanically steered audio sources.

The existing ultrasonic mixing to create an audio spotlight is generally set up with the mixing signals being sent from the same emitter. In other embodiments, the different components may come from other places so the effect could happen at the intersection of two beams. Another embodiment may involve flooding the space with one frequency, and having the other beam that it is mixing with carry all the individual audio signal. Thus, the technique of building up a waveform from different sound components, described above, can be combined with converging ultrasonic beams.

In some embodiments, the audio mapping, which translates between the listening/viewing zone coordinate system 40 and the audio source 11, may take any of various forms, such as a table or a mathematical relationship expressed in one or more translational functions, and may be determined in a manner similar to how the visual mapping is determined as described above. The audio mapping may be based on registration of reference indicia (e.g., points, lines, shapes) defined in the listening/viewing zone coordinate system 40 relative to the audio source 11, which may take any of various forms (a directional sound source, ultrasound waves, a set of directional sound emitters, etc.) as described above. For example, a registration/calibration device including a microphone may be placed and moved from one location to another in the listening/viewing area while audio calibration patterns are emitted from the audio source 11. Audio calibration (encoding) patterns (e.g., Gray-code patterns, non-return-to-zero (NRZ) digital sequences, amplitude-shift-keyed (ASK) bits, maximum-length sequences, shift-register sequences) may be emitted from the audio source 11 (e.g., by selectively turning on and off different audio frequency components on one or more audio emitters) to uniquely encode every audio beam from the audio source 11. The audio calibration patterns encode each audio direction using, for example, a particular frequency component, similarly to how the image calibration patterns encode each beamlet direction using a particular flashing point. For example, the Gray code patterns can be regions where two different frequencies of audio are sent. Another possibility is to vary the frequencies sent in different directions so that the received frequency spectrum reveals the relative direction of the calibration point (where the calibration device is located) with respect to the audio emitter. Many variations of these techniques are within the scope of the present disclosure, and these include combinations of time and frequency domain techniques.

For a mechanically steered beam, a calibration option would be to scan the listening/viewing area to find a maximum, i.e., a location at a timing at which the audio can be heard the loudest. After the first set of calibration points are acquired, that data can be used to help target the listening/viewing area to minimize the scan time. This type of scan is also a possibility for electronically steered systems.

Every audio beam captured by the microphone of the registration/calibration device placed in the listening/viewing area may be identified because each audio beam is uniquely encoded, and the captured audio beams may be traced to the audio source 11. The same process may be repeated with the registration/calibration device moved to different locations in the listening/viewing area, to thereby obtain a set of references in the listening/viewing zone coordinate system 40 and a set of references for the audio source 11. The audio mapping that translates between the listening/viewing zone coordinate system 40 and the audio source 11 may be found so as to register, align or otherwise correlate these two sets of references. For example, the audio beams of the audio calibration patterns captured at the different locations are processed to determine which audio beam best intersects with a corresponding location, and the locations respectively correlated with the audio beam directions are stored as calibration points. The calibration points are used to create a registration model, or the audio mapping, which relates the audio beam directions from the audio source 11 to the listening/viewing zone coordinate system 40.

As described above, the audio mapping and the visual mapping are determined to translate the same listening/viewing zone coordinate system 40 to the audio source 11 and the beamlet coordinate system 42, respectively. In other words, the audio mapping and the visual mapping are registered; and the locations of the personalized audio experiences are registered with the locations where visual content is presented. For example, when a single 3D camera system is used looking at the listening/viewing area, the MV display and the directional audio system can both be calibrated to the 3D camera system (i.e., the same listening/viewing zone coordinate system).

In other embodiments, instead of only one common listening/viewing zone coordinate system, the listening and viewing zone coordinate systems may be separately provided, and a mapping between the two needs to be computed. For example, MV displays precalibrated to a camera (i.e., to the viewing zone coordinate system) may be used with a directional audio system precalibrated with its own sensing system (i.e., to the listening zone coordinate system) because, for example, the directional audio system is from a different vendor/company. Typically, a directional audio system is set up with its own space model based purely on geometry. In this case, the MV display's camera system (i.e. the viewing zone coordinate system) and the audio's sensing system (i.e. the listening zone coordinate system) would need to be calibrated/registered. The implementation of the calibration procedure between the two coordinate systems would be embodiment-dependent, and involve capturing a set of data points and estimating the mathematical mapping between the listening and viewing zone coordinate systems.

Figure 8B:
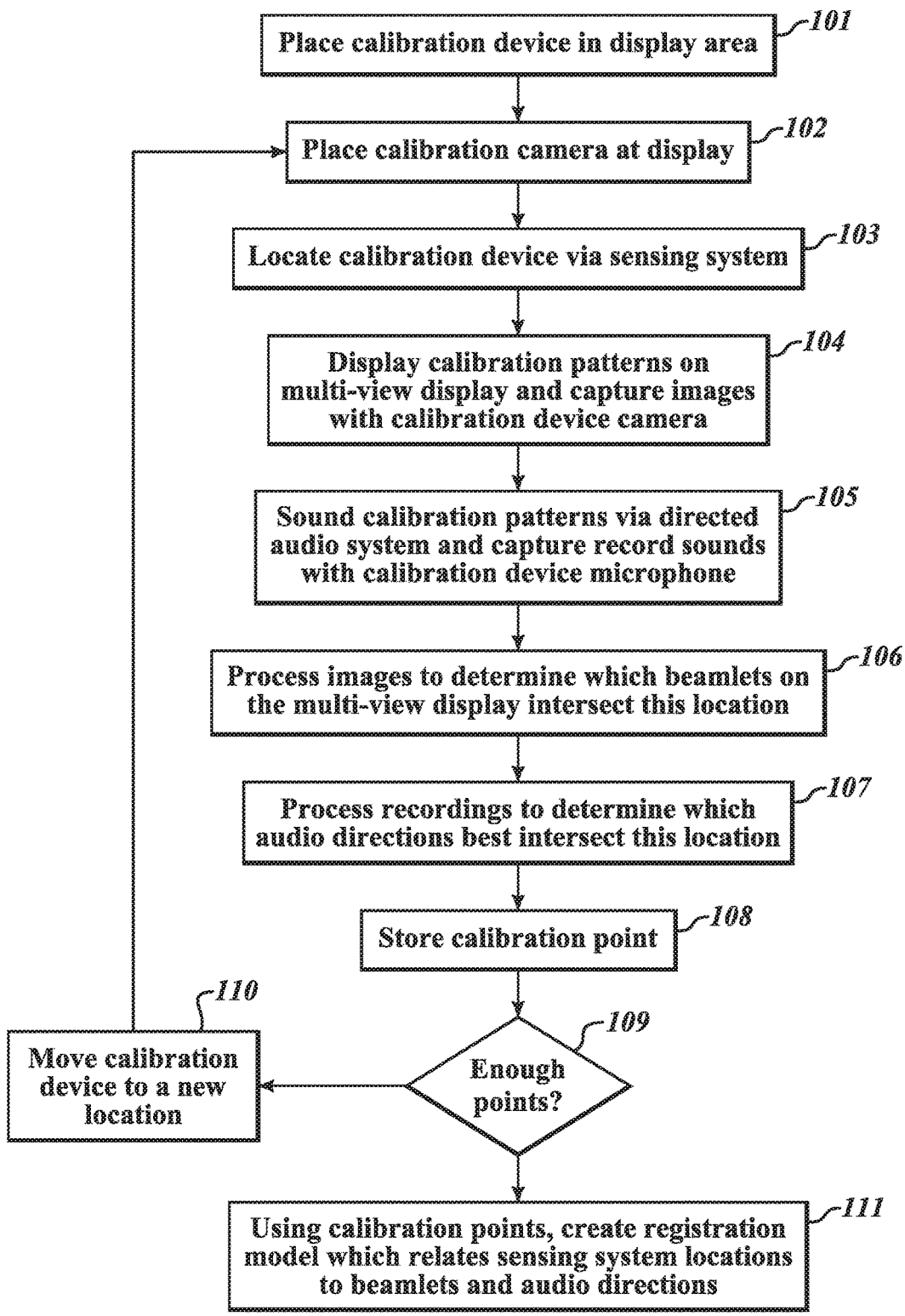
FIG. 8B is a flowchart of a sample algorithm that may be used to determine a visual mapping that translates between the listening/viewing zone coordinate system and the beamlet coordinate system and an audio mapping that translates between the listening/viewing zone coordinate system and the audio source, according to one embodiment.

FIG. 8B is a flowchart of a sample algorithm that may be used to determine a visual mapping that translates between the listening/viewing zone coordinate system 40 and the beamlet coordinate system 42, and an audio mapping that translates between the listening/viewing zone coordinate system 40 and the audio source 11. The algorithm includes steps for calibrating both the MV pixels 12a-12l and the audio source 11 to the listening/viewing zone coordinate system 40, such that the locations of the personalized visual experiences are registered with the locations of the corresponding personalized audio experiences. It should be noted that the steps may be rearranged without changing the overall functionality of the algorithm.

In step 101, a calibration device including a camera and a microphone is placed in the listening/viewing area. In step 102, the calibration device camera is pointed at an MV display including one or more MV pixels. In step 103, the location of the calibration device in the listening/viewing area is determined by a suitable sensing system, such as a camera mounted on the MV display. In step 104, image calibration patterns are displayed on the MV display and images are captured by the calibration device camera. In step 105, audio calibration patterns are emitted from the audio source 11 (in any of various forms described herein, such as a directional sound source) and sounds are captured by the calibration device microphone. In step 106, the captured images are processed to determine which beamlet(s) from the one or more MV pixels (best) intersects with this location of the calibration device. In step 107, the captured sounds are processed to determine which audio direction(s) (e.g., audio beam(s)) from the audio source 11 (best) intersects with this location of the calibration device. In step 108, the location, which is correlated with the beamlet(s) that intersects with the location and which is also correlated with the audio direction(s) that intersects with the location, is stored as a calibration point. In step 109, the algorithm determines if a sufficient number of calibration points have been stored for the purpose of building an image registration model (i.e., the visual mapping) and building a sound registration model (i.e., the audio mapping). If not, in step 110, the calibration device is moved to a new location, and at the new location, steps 102-108 are repeated to store an additional calibration point. In step 109, if the algorithm determines that a sufficient number of calibration points have been stored, in step 111, the calibration points are used to create a registration model which relates the sensing system locations of the calibration device (in the listening/viewing zone coordinate system 40) to the beamlets from the one or more MV pixels, and the audio directions from the audio source 11. Step 111 may be performed in various ways. For example, an image registration model (i.e., the visual mapping) and a sound registration model (i.e., the audio mapping) may be separately created and combined (registered), or a combined registration model including both the visual mapping and the audio mapping may be built that relates the listening/viewing zone coordinate system 40 to the beamlets from the one or more MV pixels and the audio directions from the audio source 11.

Figure 8C:
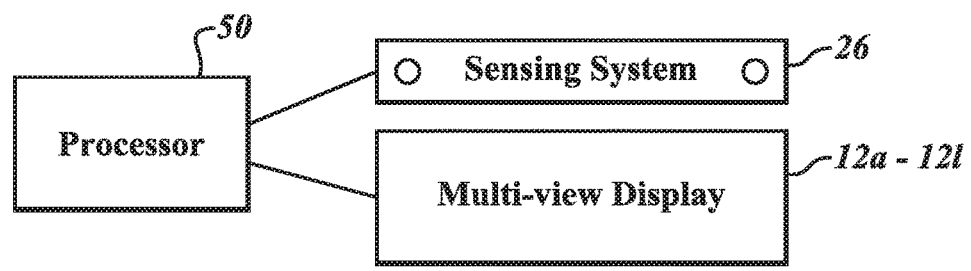
FIG. 8C depicts a sample system and process of using an audio mapping, which translates between the listening/viewing zone coordinate system and the audio source, to identify an audio parameter value to produce a corresponding audio at each of the multiple listening/viewing zones via multiple audio players (headsets).
Figure 8C:
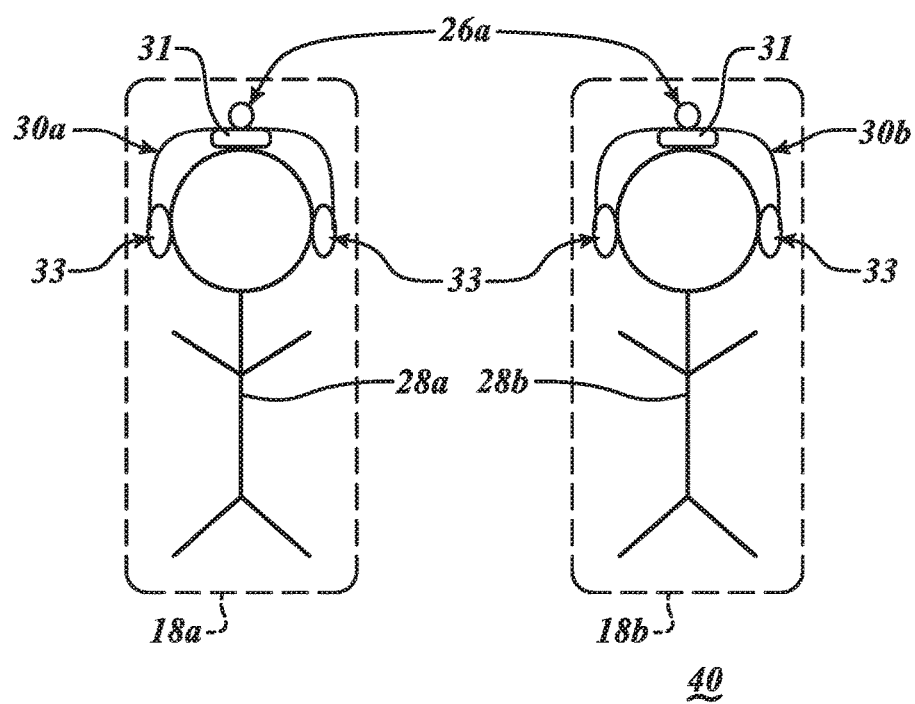

In other embodiments, as shown in FIG. 8C, the audio-visual system 10 includes multiple (personal) audio players 30*a* and 30*b* respectively associated with the multiple listening/viewing zones 18*a* and 18*b*. For example, the multiple audio players 102 may be headsets, as illustrated, or earbuds, bone conduction systems, etc. Each of the audio players 30*a* and 30*b* includes integrated electronics 31. Audio transducers 33 of the audio players 30*a* and 30*b* produce the sounds which are heard by the respective listeners 28*a* and 28*b*. The audio players 30*a* and 30*b* may have a wireless connection to the processor 50, which allows them to receive respective (personalized) audio data from the audio source 11 to present to the listeners 28*a* and 28*b*. In other embodiments, the audio players 30*a* and 30*b* may have a wired connection to the processor 50, which allows them to receive respective audio data from the audio source 11 to present to the listeners 28*a* and 28*b*.

In the embodiment of FIG. 8C, the audio-visual system 10, which includes a processor 50 and an MV display including one or more MV pixels 12*a*-12*l* (see FIG. 1), further includes a sensor 26, described above in reference to FIG. 5B. As described above, the sensor 26 is configured to identify (e.g., track) the multiple listening/viewing zones 18*a* and 18*b* and to send the specification of the multiple listening/viewing zones 18*a* and 18*b* to the input node 16 of the processor 50. In the illustrated example of FIG. 8C, the audio player 30*a*/30*b* includes a tracker 26*a* which can be tracked by the sensor 26. Thus, the sensor 26 can determine the real-time location of each of the audio players 30*a* and 30*b*. If the tracker 26*a* is mounted on the top of the headset-type audio player 30*a*/30*b*, as illustrated, the processor 50 may assign a listening/viewing zone slightly down and in front of the tracker 26*a* to correspond to the listener/viewer's face (eyes and ears). Typically, the listening/viewing zone may be set somewhat larger so that the listener/viewer 28*a* or 28*b* is unlikely to move out of the listening/viewing zone 18*a* or 18*b* before a new tracking update is available.

FIG. 8C schematically depicts a sample system and process of using an audio mapping which translates between the listening/viewing zone coordinate system 40 and the audio source 11, to identify an audio parameter value to produce a corresponding audio at each of the multiple listening/viewing zones 18*a* and 18*b* via multiple audio players (headsets) 30*a* and 30*b* respectively associated with (e.g., worn by) the listeners 28*a* and 28*b*, respectively. For example, the processor 50 may identify one or more audio parameter values that define what audio is to be produced, based on respective audio content, at/from which audio player 30*a* or 30*b*. The audio players 30*a* and 30*b* provide audio substantially only to the respective listeners 28*a* and 28*b*.

In operation, the position of each audio player 30*a* or 30*b* may be continuously tracked. The processor 50 thus receives the specification of the corresponding listening/viewing zones 18*a* and 18*b* and determines what audio and visual content to provide to each user (listener/viewer) at the corresponding listening/viewing zone 18*a* or 18*b*. The position of each listener 28*a* or 28*b* wearing each audio player 30*a* or 30*b*, optionally with the ID of the listener 28*a* or 28*b*, may be used by the processor 50 to determine what audio and visual content to present to each listener/viewer 28*a* or 28*b* at each moment, thereby personalizing the audio and visual experiences for each of the listeners/viewers 28*a* and 28*b*.

The processor 50 outputs control signaling for the audio source 11 (not shown in FIG. 8C) and the MV pixels 12*a*-12*l*, wherein the control signaling defines production of the (personalized) audio generated from the determined audio content at each of the listening/viewing zones 18*a* and 18*b* via the respective audio players 30*a* and 30*b*, and defines color and brightness of each of the beamlets in each bundle to project the corresponding (personalized) image to the corresponding one of the listening/viewing zones 18*a* and 18*b*.

In some embodiments, listeners/viewers may be in essentially fixed locations. For example, in a theater, different patrons may wish to enjoy different versions of the movie. In this case, the theater may be outfitted with wired or wireless headsets (30*a*/30*b*) installed at each seat. In this setup, there is no need for trackers 26*a* and a sensor (sensing system) 26 because the locations of the headsets 30*a* and 30*b* are known in advance. In this case, the MV display is prearranged to send visual content to these known locations (i.e., known listening/viewing zones 18*a* and 18*b*), respectively. The processor 50 uses data showing which headset (30*a*/30*b*) is in which listening/viewing zone (18*a*/18*b*) to coordinate (personalize) the audio and visual content of the presentation for each of the listeners/viewers 28*a* and 28*b*.

Somewhat more generally, the listening/viewing area may be outfitted with many speakers, each designed to provide audio in a specific listening/viewing zone, as briefly described above. An example of this is an array of speakers installed in a ceiling. The speakers may be directional (e.g., via reflective domes) to limit the spill of audio to neighboring listening/viewing zones.

In each of the various embodiments and examples described above, an audio parameter value used to produce a particular audio based on an audio content at one listening/viewing zone is identified and included in the control signaling 54 for the audio source 11. For example, when a directional sound source is used, the control signaling includes audio parameter values that control audio content as well as directions of audio (audio beams) to respective listening/viewing zones. When multiple audio players are used, the control signaling includes audio parameter values that control which audio player is to produce which audio.

The control signaling 54 for the audio source 11 may be output from the processor 50 via any suitable medium including wireline and/or wireless medium, and via any suitable protocol (e.g., Bluetooth, Wi-Fi, cellular, optical, ultrasound).

Figure 9:
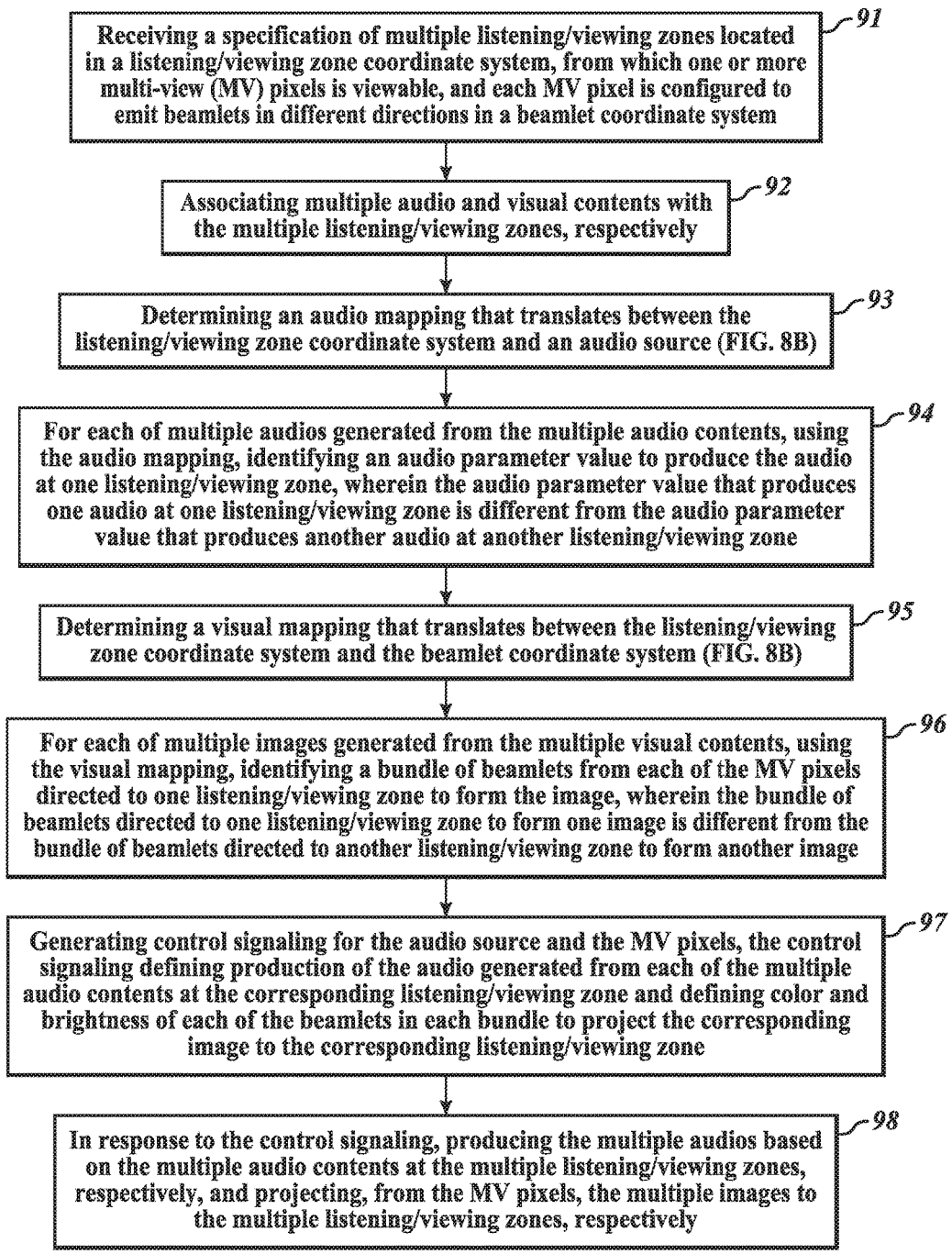
FIG. 9 is a flowchart depicting an audio-visual display method of receiving a specification of multiple listening/viewing zones and producing multiple audio at and projecting multiple images to the multiple listening/viewing zones, according to one embodiment.

FIG. 2 illustrates details of the processor 50 of the audio-visual system 10 according to one embodiment, and FIG. 9 is a flowchart depicting a sample audio-visual display method that may be executed by the processor 50. The method includes receiving a specification of multiple listening/viewing zones and producing multiple audio and multiple images at the multiple listening/viewing zones. Various components 32, 34, 36 and 38 in the processor 50 of FIG. 2, to be described in detail below, may be realized by hardware, software, or a combination of hardware and software, and each component may be partly or entirely realized by circuitry, a general-purpose processor or a special-purpose processor executing a software algorithm.

In step 91 of FIG. 9, the processor 50 receives a specification of multiple listening/viewing zones 18 located in a listening/viewing zone coordinate system 40, wherein the multiple listening/viewing zones are positioned in the listening/viewing zone coordinate system 40, for example, relative to one or more multi-view (MV) pixels 12. Each MV pixel is configured to emit beamlets in different directions in a beamlet coordinate system.

In the processor 50, a listening/viewing zones processor 32 is responsible for processing the specification of the multiple listening/viewing zones 18 as received via the input node 16. In some embodiments, the multiple listening/viewing zones 18 as received via the input node 16 may be explicitly defined in the listening/viewing zone coordinate system 40; for example, when the multiple listening/viewing zones 18 are specified on the UI device 20 by an operator. In other embodiments, the multiple listening/viewing zones 18 as received via the input node 16 may be implicitly defined, for example, in the form of the locations of multiple targets as identified by the sensor 26. In these embodiments, the listening/viewing zones processor 32 receives the identified locations of multiple targets, and performs any necessary processing to explicitly specify the multiple listening/viewing zones 18 based on the identified locations, such as by defining a point, a 2D shape, or a 3D shape that corresponds to each of the identified locations. The listening/viewing zones processor 32 may use any of a number of image-processing techniques to process (e.g., recognize) the locations of multiple targets as identified by the sensor 26, such as stitching/registration, morphological filtering, thresholding, pixel counting, image segmentation, face detection, edge detection, and blob discovery and manipulation. The listening/viewing zones processor 32 specifies multiple listening/viewing zones based on the processed (e.g., recognized) locations of the multiple targets. In various embodiments, the multiple listening/viewing zones may be stored in the memory 35 to be accessible by various components of the processor 50.

In step 92 of FIG. 9, the processor 50 associates multiple audio and visual contents with the multiple listening/viewing zones 18, respectively. In the processor 50, a zones-and-contents association module 36 running an association application is responsible for carrying out the association. To that end, the memory 35 may store the multiple audio and visual contents and/or content descriptors of the multiple audio and visual contents. For example, multiple audio and visual contents or content descriptors may be stored in one or more content servers networked together that collectively serve as part of the memory 35 accessible by the processor 50.

The multiple audio and visual contents themselves (based on which audio and images may be generated) may be stored, or the content descriptors (e.g., content providers, content types) may be stored that can be used to access the multiple audio and visual contents, for example, via a network connection. In these embodiments, the zones-and-contents association module 36 may select a particular audio and visual content or content descriptor for each listening/viewing zone. In other embodiments, the zones—and contents association module 36 may create (generate) a particular audio and visual content for each listening/viewing zone.

The association program running on the zones-and-contents association module 36 is responsible for fetching or creating multiple audio and visual contents for multiple listening/viewing zones, respectively. The association program may refer to defined association rules to associate the multiple listening/viewing zones 18 with multiple audio and visual contents. For example, the rules may be used to select or create a particular audio and visual content for each listening/viewing zone based on the characteristics of the listening/viewing zone, or, if the sensor 26 is used to detect a location of a target (e.g., a viewer or a viewer surrogate) that specifies a listening/viewing zone, based on the characteristics of the target. As a specific example, multiple audio and visual contents may be associated with the locations of the listening/viewing zones, such that those audio and visual contents can be used as bases to generate audio and images that are particularly selected as appropriate for display at those locations. As another example, multiple audio and visual contents are associated with the targets (e.g., viewers) at the listening/viewing zones, such that those audio and visual contents can be used as bases to generate audio and images that are particularly selected as appropriate for the targets.

In further embodiments, the specification of the multiple listening/viewing zones 18 as received via the input node 16 may be associated with multiple audio and visual contents, respectively. For example, when the UI device 20 is used to specify the multiple listening/viewing zones 18, the UI device 20 may additionally be used to associate the specified listening/viewing zones 18 with multiple audio and visual contents, respectively, based on an operator input into the UI device 20 for example. In these embodiments, the zones-and-contents association module 36 of the processor 50 receives and/or verifies the association between the listening/viewing zones 18 and the multiple audio and visual contents as received via the input node 16.

In some embodiments, multiple audio and visual contents to be associated with the multiple listening/viewing zones 18 may be generated in real time by the zones-and-contents association module 36. For example, the association application running on the zones-and-contents association module 36 may generate audio and visual content (e.g., signage, a lighting pattern) in real time for each listening/viewing zone; for example, as a function of the characteristics of the listening/viewing zone.

In step 93 of FIG. 9, the processor 50 determines (e.g., identifies, accesses, generates) an audio mapping that translates between the listening/viewing zone coordinate system 40 and an audio source 11, as described above in reference to FIG. 8B. In various embodiments, the audio mapping may be stored (or pre-stored) in the memory 35, in which case the processor 50 accesses the stored audio mapping. In the processor 50, a mapping engine 34 is responsible for determining (e.g., identifying, accessing, generating) the audio mapping.

Multiple audio mappings (e.g., one that translates from the listening/viewing zone coordinate system 40 to the audio source 11, and another that translates from the audio source 11 to the listening/viewing zone coordinate system 40) may be stored in the memory 35, and the mapping engine 34 may selectively access one or more suitable audio mapping(s) therefrom. In various embodiments, the mapping engine 34 determines (e.g., accesses) the audio mapping(s), and a beamlet-bundles identification & audio parameter-values identification module 38, to be described below, applies the audio mapping(s) to identify the audio parameter values that produce the desired audio at the corresponding listening/viewing zones, respectively.

As described above, the audio mapping between the listening/viewing zone coordinate system 40 and the audio source 11 may be pre-stored in the memory 35, or may be received into the memory 35 via the input node 16 at appropriate timings. For example, when the UI device 20 is used to specify the multiple listening/viewing zones 18, the listening/viewing zone coordinate system 40 used by the listening/viewing zone specification application running on the UI device 20 may be used to generate an audio mapping, which may be received together with the specification of the multiple listening/viewing zones 18, via the input node 16, from the UI device 20.

In step 94 of FIG. 9, for each of multiple audio generated from the multiple audio contents (associated with the multiple listening/viewing zones in step 92, by the zones-and-content association module 36), using the audio mapping (determined/identified/accessed/generated) in step 93, by the mapping engine 34), the processor 50 identifies one or more audio parameter values to produce the audio at one listening/viewing zone 18. The one or more audio parameter values that produces one audio at one listening/viewing zone 18a is different from the one or more audio parameter values another audio at another listening/viewing zone 18b. In the processor 50, a beamlet-bundles identification & audio parameter-values identification module 38 running an audio parameter-value identification application is responsible for applying the audio mapping to identify the audio parameter values to produce respective audio at their corresponding listening/viewing zones 18a and 18b, respectively.

In step 95 of FIG. 9, the processor 50 determines (e.g., identifies, accesses, generates) a visual mapping that translates between the listening/viewing zone coordinate system 40 and the beamlet coordinate system 42, as described above in reference to FIG. 8B. In various embodiments, the visual mapping may be stored (or pre-stored) in the memory 35, in which case the processor 50 accesses the stored visual mapping. In the processor 50, a mapping engine 34 is responsible for determining (e.g., identifying, accessing, generating) the visual mapping.

Multiple visual mappings (e.g., one that translates from the listening/viewing zone coordinate system 40 to the beamlet coordinate system 42, and another that translates from the beamlet coordinate system 42 to the listening/viewing zone coordinate system 40) may be stored in the memory 35, and the mapping engine 34 may selectively access one or more suitable visual mapping(s) therefrom. In various embodiments, the mapping engine 34 determines (e.g., accesses) the visual mapping(s), and a beamlet-bundles identification & audio parameter-values identification module 38 applies the visual mapping(s) to identify the bundle of beamlets that hit each listening/viewing zone.

As described above, the visual mapping between the listening/viewing zone coordinate system 40 and the beamlet coordinate system 42 may be pre-stored in the memory 35, or may be received into the memory 35 via the input node 16 at appropriate timings. For example, when the UI device 20 is used to specify the multiple listening/viewing zones 18, the listening/viewing zone coordinate system 40 used by the listening/viewing zone specification application running on the UI device 20 may be used to generate a visual mapping, which may be received together with the specification of the multiple listening/viewing zones 18, via the input node 16, from the UI device 20.

In step 96 of FIG. 9, for each of multiple images generated from the multiple visual contents (associated with the multiple listening/viewing zones in step 92, by the zones-and-content association module 36), using the visual mapping (determined/identified/accessed/generated) in step 93, by the mapping engine 34, the processor 50 identifies a bundle of beamlets from each of the MV pixels directed to one listening/viewing zone to form the image. In the processor 50, a beamlet-bundles identification & audio parameter-values identification module 38 running a bundle identification application is responsible for applying the visual mapping to identify the multiple bundles 52a, 52b of beamlets directed to the multiple listening/viewing zones 18a, 18b to form the multiple images, respectively (see the examples of FIGS. 7A, 7B and 7C, described above). Generally, the bundle identification application, for each of the images, identifies a bundle of beamlets that "hit" or "land" on/in the corresponding listening/viewing zone to form the image.

In step 97 of FIG. 9, the processor 50 generates control signaling 54 for the audio source 11 and the MV pixels 12a-12l, wherein the control signaling defines production of the audio generated from each of the multiple audio contents at the corresponding listening/viewing zone, and defines color and brightness of each of the beamlets in each bundle to project the corresponding image to the corresponding listening/viewing zone. For example, the control signaling 54 may define each audio content and the corresponding audio direction, and define, for each of the beamlets, color in YCbCr or in RGB space (e.g., a full palette of possible colors) including a transparency value ("a"), and brightness in a luminosity value ("L").

In step 98 of FIG. 9, in response to the control signaling 54, the multiple audio based on the multiple audio contents from the audio source 11 are produced at the multiple listening/viewing zones 18a and 18b, respectively. Also in response to the control signaling 54, the multiple images based on the multiple visual contents are projected from the MV pixels to the multiple listening/viewing zones 18a and 18b, respectively.

In some embodiments, due to the audio wavelengths involved, it may be difficult to create narrow audio beams. With most techniques, the audio level drops off gradually when exiting the main beam, and there may even be significant side lobes. Human hearing has a tremendous dynamic range, and thus it may be difficult to guarantee that sound will not leak into surrounding areas. In these cases, masking can be employed, adding some amount of noise to the environment to prevent people outside the main beam from being able to discern the audio content.

In some embodiments involving very large venues, such as stadiums, there may be considerable delay for sound emitted from a directed audio system to reach the listener. This can cause a visual display, which emits content at the speed of light, to be out of sync with the far slower audio. One of the advantages of the present disclosure is that the image shown by an MV display to a distant listener/viewer can be purposefully delayed so as to arrive in synchronization with slow traveling audio. Because the display is multi-view, people who are closer and thus have less delayed audio can simultaneously be seeing visual content that is less delayed to match their audio stream.

The following describes five sample applications of an audio-visual method according to various embodiments:

1) Take for example a stadium, theater, or other venue that features large MV displays—maybe a scoreboard, for instance. Alternatively the venue may be covered with MV displays—on the walls, ceiling, and/or floors. During an event or performance, as different sections of the audience simultaneously see different visual content while looking at the same MV display(s), the sections also simultaneously hear different versions of audio content. Typically the visual and audio content support/reinforce/complement each other. The differentiated listening zones and viewing zones may or may not perfectly coincide location-wise. In one of countless scenarios, there may be ten viewing zones but only five listening zones—maybe each listening zone contains two viewing zones. This may be done because the listening zones are less precise, for instance.

2) A public venue, such as a retail, dining, and entertainment area, has MV displays that simultaneously show different visual content to different visitors. The visual content may be advertising, entertainment, informational, directional, and so forth. When an individual looks at an MV display and sees a differentiated version of visual content—say an ad for a resort in Hawaii, they may also hear a differentiated version of audio content—maybe a ukulele. When the individual transitions into another viewing zone for the same MV display, they may then see and hear another coordinated package of visuals and audio.

3) Occupants of a public venue are exiting the space, and look to MV exit signs for directions indicating which of multiple egresses is best for each individual. The MV exit sign indicating one person's optimal exit—e.g., door #3—flashes for the person, but not for other occupants who should use other exits. At the same time, the directional audio reinforces this message by saying to the person he/she should use door #3. This way, audio and visual cues are both given to occupants to guide them to the best exit.

4) An MV signal, warning, emergency, or directional light simultaneously appears different to different people, vehicles, and locations. These MV lights can be synchronized with directional audio to provide sounds that reinforce the visual message of the light—for example, a bell, alarm, siren, horn, voice, and so forth. In this manner, the MV lights can function similarly to their non-MV counterparts.

5) An MV cuing/prompting display provides visual prompts to performers. Audiences cannot see the prompts. With directional audio, these prompts can be accompanied by audio cues—such as a metronome, instrumentation, and so forth, to enhance their usefulness.

Figure 10A:
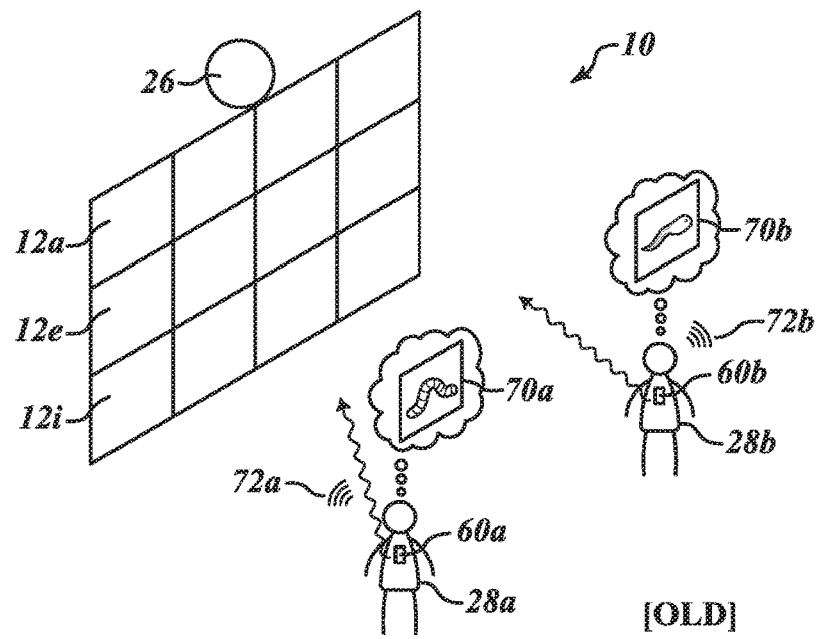
FIGS. 10A and 10B illustrate updating of audio and images conveyed to multiple listening/viewing zones as the listening/viewing zones move from old locations to new locations.
Figure 10B:
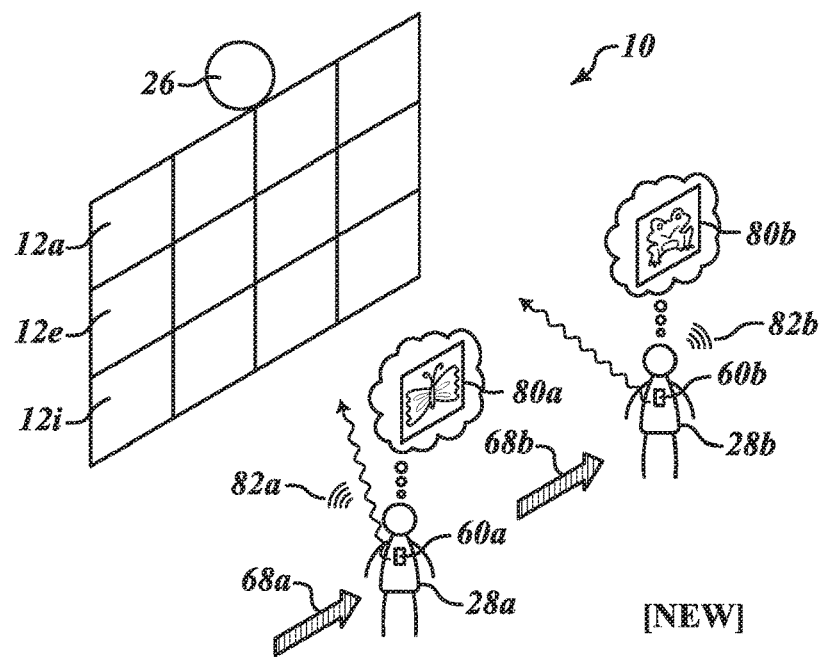

Referring back to FIG. 5B, the sensor 26 may be used to detect locations of multiple targets (e.g., multiple viewers 28a, 28b) that are moving and to specify the new detected locations of the multiple targets as new multiple listening/viewing zones. The processor 50 may then update the multiple audio and visual contents so that new audio and new images may be generated from the updated multiple audio and visual contents to be audible and visible at the new multiple listening/viewing zones. FIGS. 10A and 10B illustrate such embodiments.

In FIGS. 10A and 10B, the multiple targets identified by the sensor 26 are not the multiple listeners/viewers 28a, 28b themselves, but are multiple listener/viewer surrogates 60a, 60b, i.e., elements used to locate and/or track the multiple listeners/viewers 28a, 28b, such as tags (e.g., passive patterns such as QR code, bar code, active optical tags such as blinking IR LEDs which flashes unique codes that are detected by IR sensitive cameras, radio tags such as RFID tags, or ultrasonic tags) the listeners/viewers may wear (e.g., incorporated in a badge, wrist band), mobile devices (e.g., smartphones, wands) functioning as trackable objects that the listeners/viewers may carry, mobile audio devices (e.g., headphones, smartphones, ipods) functioning as trackable objects that can serve as the source of the differentiated audio that is tied/synchronized to the differentiated image, conveyances that may transport the listeners/viewers such as vehicles, or any other types of markers that may represent the listeners/viewers. The sensor 26 is configured to detect locations of the listener/viewer surrogates 60a, 60b, using any suitable location technologies or techniques such as RFID technology, EM interrogation technology, or GPS technology. When the sensor 26 is used to detect locations of the multiple targets 28a, 28b (via the listener/viewer surrogates 60a, 60b) which are moving from the original locations in FIG. 10A to the new locations in FIG. 10B, as indicated by arrows 68a, 68b, the input node 16 of the audio-visual system 10 may receive a new specification of new multiple listening/viewing zones based on the new detected locations. The processor 50 associates multiple audio and visual contents with the new multiple listening/viewing zones, respectively, and, for each of the multiple audio and images generated from the multiple audio and visual contents, uses the audio mapping to identify one or more audio parameter values that produces the desired audio at each new listening/viewing zone, and uses the visual mapping to identify a bundle of beamlets from each of the MV pixels directed to each new listening/viewing zone to form the image. The audio-visual system 10 is capable of producing the multiple audio and the multiple images at the new multiple listening/viewing zones, respectively.

In some embodiments, the multiple audio and visual contents associated with the new multiple listening/viewing zones may be updated from the multiple audio and visual contents previously associated with the (old) multiple listening/viewing zones. For example, in FIG. 10A, an image of a caterpillar 70a generated from an old visual content is projected to, with an old audio 72a associated with the caterpillar image 70a produced at, an old listening/viewing zone of the listener/viewer 28a, and an image of a tadpole 70b generated from an old content is projected to, with an old audio 72b associated with the tadpole image 70b produced at, an old listening/viewing zone of the other listener/viewer 28b. After both of the listeners/viewers 28a, 28b have moved to new locations, in FIG. 10B, a different (updated) image of a butterfly 80a generated from an updated content is projected to, with an update audio 82a associated with the butterfly image 80a produced at, a new listening/viewing zone of the listener/viewer 28a, and a different (updated) image of a frog 80b generated from an updated content is projected to, with a new audio 82b associated with the frog image 80b produced at, a new listening/viewing zone of the other listener/viewer 28b. Thus, each listener/viewer may experience updated or changing audio and visual contents (e.g., from audio and visual presentation on caterpillar 70a/72a to audio and visual presentation on butterfly 80a/82b for the listener/viewer 28a, and from audio and visual presentation on tadpole 70b/72b to audio and visual presentation on frog 80b/82b for the other listener/viewer 28b) based on the updated audio and visual contents as the listeners/viewers move in the listening/viewing zone coordinate system 40. Different listeners/viewers 28a and 28b may experience different (and differently updated or changed) audio and images based on the updated audio and visual contents, respectively.

The following describes five sample use cases of the audio-visual system and method according to various embodiments:

A) One application that converges multi-view and directable audio uses the audio to signal a transition between viewing zones. When a person travels from one viewing zone into a neighboring one, the person may hear a sound effect like a chime or tone. Similarly, there may be an audio "bridge" that smoothly connects different audio/visual experiences in contiguous zones by transitioning from one to another, like when songs are bridged in a film or show. As another example, a voice—a "guide"—announces the transition. These transition techniques may serve to smooth/blend a transition or to cover or accentuate a transition.

B) Another application provides audio cues/instructions/signals on how to access different viewing zones, or different versions of content. The cue may be in the form of explicit directions; or a tone or note; or a change in volume; and so forth.

C) Conversely, the MV display may visually signal a change between audio zones, or visually direct people from one audio zone to the next.

D) Localized audio may trigger a change in the visual content delivered to a specific zone. For instance, a loudly cheering section in a stadium may see something different on a scoreboard than what a quiet section is able to see. Alternatively, the multi-view lights throughout a music festival may appear different in different zones, to support each of multiple performances taking place. In this case, different musical cues may trigger a custom selection of colors, brightness levels, strobes, and so forth, and these performance-specific effects would only appear to those occupying the audio zone to which they apply.

E) Multi-view lights (MV architectural lights) may be coordinated with directional audio so a lighting mood is synchronized with an audio mood. For example, a park may be covered in MV lights, and when a person is in the northern quadrant of the park, every light throughout the park appears a sparkling blue or white—creating a wintery effect. To reinforce the lighting, the audio may be classical music. But, for anyone viewing the park from the southern quadrant, every light in the park may appear to be hot red—like a blistering summer day, while the audio track is a sizzling hot Latin tune. Thus, every light throughout the park simultaneously supports each of four themes viewable from each quadrant, while directable or localized audio reinforces each theming—as one example. Similarly, MV architectural lights may create the appearance of fireworks or a shooting star, accompanied by an audio effect coordinated to the location of the visual effect.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. An audio-visual system comprising:
  an audio source;
  one or more multi-view (MV) pixels, wherein each MV pixel is configured to emit beamlets in different directions in a beamlet coordinate system;
  an input node which, in operation, receives a specification of multiple listening/viewing zones located in a listening/viewing zone coordinate system; and
  a processor which is coupled to the input node and which, in operation:
    associates multiple audio and visual contents with the multiple listening/viewing zones, respectively;
    determines an audio mapping that translates between the listening/viewing zone coordinate system and the audio source;
    for each of multiple audio generated from the multiple audio contents, using the audio mapping, identifies an audio parameter value to produce the audio at one listening/viewing zone, wherein the audio parameter value that produces one audio at one listening/viewing zone is different from the audio parameter value that produces another audio at another listening/viewing zone;
    determines a visual mapping that translates between the listening/viewing zone coordinate system and the beamlet coordinate system;
    for each of multiple images generated from the multiple visual contents, using the visual mapping, identifies a bundle of beamlets from each of the MV pixels directed to one listening/viewing zone to form the image, wherein the bundle of beamlets directed to one listening/viewing zone to form one image is different from the bundle of beamlets directed to another listening/viewing zone to form another image; and
    outputs control signaling for the audio source and the MV pixels, the control signaling defining production of the audio generated from each of the multiple audio contents at the corresponding listening/viewing zone and defining color and brightness of each of the beamlets in each bundle to project the corresponding image to the corresponding listening/viewing zone;
  wherein the audio source, in response to the control signaling from the processor, produces the multiple audio based on the multiple audio contents at the multiple listening/viewing zones, respectively, and the MV pixels, in response to the control signaling from the processor, projects the multiple images to the multiple listening/viewing zones, respectively.

2. The audio-visual system of claim 1, wherein the audio source comprises multiple speakers configured to produce the multiple audio at the multiple listening/viewing zones, respectively.

3. The audio-visual system of claim 1, wherein the audio source comprises a directional sound source configured to directionally produce the multiple audio at the multiple listening/viewing zones, respectively.

4. The audio-visual system of claim 3, wherein the audio source comprises ultrasound waves configured to carry the multiple audio to be produced at the multiple listening/viewing zones, respectively.

5. The audio-visual system of claim 3, wherein the audio source comprises multiple directional sound emitters configured to carry audio components to be combined at the corresponding listening/viewing zone to produce the corresponding audio.

6. The audio-visual system of claim 3, wherein the audio source comprises a beam steering system configured to electronically steer the multiple audio to the multiple listening/viewing zones, respectively.

7. The audio-visual system of claim 3, wherein the audio source comprises a mechanical steering system configured to mechanically steer the audio source or an audio reflector associated with the audio source to point each of the multiple audio to the corresponding listening/viewing zone.

8. The audio-visual system of claim 1, comprising:
multiple audio players associated with the multiple listening/viewing zones,
wherein the control signaling for the audio source directs the multiple audio players to produce the multiple audio, respectively.

9. The audio-visual system of claim 8, wherein the audio players are selected from a group consisting of earbuds, headsets, and bone conduction systems.

10. The audio-visual system of claim 8, comprising:
a sensor configured to identify the multiple listening/viewing zones and send the specification of the multiple listening/viewing zones to the input node,
wherein the sensor is configured to detect locations of the multiple audio players and specify the detected locations of the multiple audio players as the multiple listening/viewing zones.

11. The audio-visual system of claim 1, comprising:
a sensor configured to identify the multiple listening/viewing zones and send the specification of the multiple listening/viewing zones to the input node.

12. The audio-visual system of claim 11, wherein the sensor is configured to detect locations of multiple targets and specify the detected locations of the multiple targets as the multiple listening/viewing zones, wherein the multiple targets are multiple viewers or multiple viewer surrogates.

13. The audio-visual system of claim 12, wherein,
the input node, in operation,
receives a new specification of new multiple listening/viewing zones based on the detected locations of the multiple targets, which have moved, and
the processor, in operation:
associates the multiple audio and visual contents with the new multiple listening/viewing zones, respectively,
for each of the multiple audio generated from the multiple audio contents, using the audio mapping, identifies an audio parameter value to produce the audio at one new listening/viewing zone;
for each of the multiple images generated from the multiple visual contents, using the visual mapping, identifies a bundle of beamlets from each of the MV pixels directed to the one new listening/viewing zone to form the image, and
outputs new control signaling defining production of the audio generated from each of the multiple audio contents at the corresponding new listening/viewing zone and defining color and brightness of each of the beamlets in each bundle to project the corresponding image to the corresponding new listening/viewing zone;
wherein the audio source, in response to the new control signaling, produces the multiple audio based on the multiple audio contents at the new multiple listening/viewing zones, respectively, and the MV pixels, in response to the new control signaling, projects the multiple images to the new multiple listening/viewing zones, respectively.

14. The audio-visual system of claim 13, wherein the multiple audio and visual contents associated with the new multiple listening/viewing zones are updated from the multiple audio and visual contents that were previously used to produce the multiple audio and the multiple images at the multiple listening/viewing zones.

15. An audio-visual method comprising:
receiving a specification of multiple listening/viewing zones located in a listening/viewing zone coordinate system, from which one or more multi-view (MV) pixels is viewable, and each MV pixel is configured to emit beamlets in different directions in a beamlet coordinate system;
associating multiple audio and visual contents with the multiple listening/viewing zones, respectively;
determining an audio mapping that translates between the listening/viewing zone coordinate system and an audio source;
for each of multiple audio generated from the multiple audio contents, using the audio mapping, identifying an audio parameter value to produce the audio at one listening/viewing zone, wherein the audio parameter value that produces one audio at one listening/viewing zone is different from the audio parameter value that produces another audio at another listening/viewing zone;
determining a visual mapping that translates between the listening/viewing zone coordinate system and the beamlet coordinate system;
for each of multiple images generated from the multiple visual contents, using the visual mapping, identifying a bundle of beamlets from each of the MV pixels directed to one listening listening/viewing zone to form the image, wherein the bundle of beamlets directed to one listening/viewing zone to form one image is different from the bundle of beamlets directed to another listening/viewing zone to form another image;
generating control signaling for the audio source and the MV pixels, the control signaling defining production of the audio generated from each of the multiple audio contents at the corresponding listening/viewing zone and defining color and brightness of each of the beamlets in each bundle to project the corresponding image to the corresponding listening/viewing zone; and
in response to the control signaling, producing the multiple audio based on the multiple audio contents at the multiple listening/viewing zones, respectively, and projecting, from the MV pixels, the multiple images to the multiple listening/viewing zones, respectively.

16. The audio-visual method of claim 15, comprising:
in response to the control signaling for the audio source, controlling directions of the multiple audio to be produced at the multiple listening/viewing zones, respectively.

17. The audio-visual method of claim 15, wherein the step of determining the audio mapping includes:
using a directional audio source, producing sound calibration patterns in the listening/viewing zone coordinate system and capturing sounds with a calibration device microphone placed at different locations;
processing the sounds captured at the different locations to determine which audio direction of the directional audio source best intersects with a corresponding location and storing the locations respectively correlated with the audio directions as calibration points;
using the calibration points, creating a registration model which relates the audio directions to the listening/viewing zone coordinate system.

18. The audio-visual method of claim 17, wherein the step of determining the visual mapping includes:
- using the MV pixel, displaying image calibration patterns in the listening/viewing zone coordinate system and capturing images with a calibration device camera placed at different locations;
- processing the images captured at the different locations to determine which beamlet direction of the MV pixel best intersects with a corresponding location and storing the locations respectively correlated with the beamlet directions as calibration points;
- using the calibration points, creating a registration model which relates the beamlet directions to the listening/viewing zone coordinate system.

19. The audio-visual method of claim 15, wherein the control signaling for the MV pixels is time delayed relative to the control signaling for the audio source so that the image is projected simultaneously with production of the corresponding audio at the corresponding listening/viewing zone.

\* \* \* \* \*